United States Patent
Qi et al.

(10) Patent No.: US 11,349,565 B2
(45) Date of Patent: May 31, 2022

(54) METHOD AND APPARATUS FOR ESTABLISHING OPTICAL CABLE CONNECTION

(71) Applicant: HUAWEI TECHNOLOGIES CO., LTD., Guangdong (CN)

(72) Inventors: Biao Qi, Wuhan (CN); Wei Xiong, Dongguan (CN); Qi Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/361,112

(22) Filed: Jun. 28, 2021

(65) Prior Publication Data

US 2021/0328668 A1 Oct. 21, 2021

Related U.S. Application Data

(63) Continuation of application No. PCT/CN2018/124598, filed on Dec. 28, 2018.

(51) Int. Cl.
*H04B 10/079* (2013.01)
*G02B 6/44* (2006.01)
(Continued)

(52) U.S. Cl.
CPC ......... *H04B 10/0791* (2013.01); *G02B 6/447* (2013.01); *H04B 5/0062* (2013.01);
(Continued)

(58) Field of Classification Search
CPC .............. H04B 10/0791; H04B 5/0062; H04B 10/25753; H04B 10/27; H04B 10/80; G02B 6/447
See application file for complete search history.

(56) References Cited

U.S. PATENT DOCUMENTS 7,173,937 B1   2/2007  Chen et al.
8,831,425 B1 * 9/2014  Bernstein ............... H04B 10/27
                                                    398/70
(Continued)

FOREIGN PATENT DOCUMENTS

CN    101969385 A    2/2011
CN    102546221 A    7/2012
(Continued)

OTHER PUBLICATIONS

Osman S. Gebizlioglu, ODN Intelligence—Automating Fiber Deployment and Operations, 2013 OSA, 4 pages.
(Continued)

*Primary Examiner* — Mina M Shalaby
(74) *Attorney, Agent, or Firm* — James Anderson Harrison

(57) ABSTRACT

This application provides a method and an apparatus for establishing an optical cable connection. The method includes: receiving, by a network device, a service provisioning request message including user information from a terminal device; allocating, by the network device, an optical splitter port based on the user information; sending, by the network device, a service provisioning response message to the terminal device, where the service provisioning response message includes the user information and port information; receiving, by the network device, an optical cable installation complete indication message sent by the terminal device, where the optical cable installation complete indication message carries the port identifier, the user information, and an optical cable identifier, and the optical cable identifier is used to indicate an optical cable corresponding to the user information; and storing, by the network device, a correspondence between the optical cable identifier, the port identifier, and the user information.

20 Claims, 12 Drawing Sheets

(51) Int. Cl.
*H04B 5/00* (2006.01)
*H04B 10/2575* (2013.01)
*H04B 10/27* (2013.01)
*H04B 10/80* (2013.01)

(52) U.S. Cl.
CPC ....... *H04B 10/25753* (2013.01); *H04B 10/27* (2013.01); *H04B 10/80* (2013.01)

(56) References Cited

U.S. PATENT DOCUMENTS

| | | | |
|---|---|---|---|
| 9,577,783 B2* | 2/2017 | Luo | H04B 10/27 |
| 2010/0196006 A1* | 8/2010 | Lin | H04L 12/287 |
| | | | 398/58 |
| 2013/0236185 A1* | 9/2013 | Fang | H04L 41/0806 |
| | | | 398/115 |
| 2013/0315594 A1* | 11/2013 | Liang | H04Q 11/0067 |
| | | | 398/66 |
| 2014/0178067 A1* | 6/2014 | Cheng | H04B 10/27 |
| | | | 398/45 |
| 2014/0201260 A1 | 7/2014 | Dor et al. | |
| 2014/0334822 A1* | 11/2014 | Hajduczenia | H04Q 11/0067 |
| | | | 398/58 |
| 2014/0348508 A1 | 11/2014 | Weng et al. | |
| 2015/0139645 A1* | 5/2015 | Yao | H04B 10/27 |
| | | | 398/58 |
| 2015/0222361 A1* | 8/2015 | Dhaini | H04Q 11/0067 |
| | | | 398/66 |
| 2016/0173193 A1 | 6/2016 | Zhu et al. | |
| 2016/0294689 A1* | 10/2016 | Zheng | H04L 41/00 |
| 2017/0054719 A1* | 2/2017 | Zheng | H04J 14/026 |
| 2017/0064418 A1* | 3/2017 | Tao | H04Q 11/0062 |
| 2017/0117960 A1* | 4/2017 | Peng | H04B 10/073 |
| 2017/0237518 A1* | 8/2017 | Yang | H04J 14/0282 |
| | | | 398/79 |
| 2017/0279525 A1* | 9/2017 | Qu | H04B 10/0731 |
| 2018/0309517 A1* | 10/2018 | Zheng | H04L 12/4641 |
| 2019/0289374 A1* | 9/2019 | Vilella | H04L 63/0414 |
| 2019/0319709 A1* | 10/2019 | Zheng | H04Q 11/00 |
| 2019/0387295 A1* | 12/2019 | Zhang | H04B 10/27 |
| 2020/0204257 A1* | 6/2020 | Krampl | H04Q 11/0071 |

FOREIGN PATENT DOCUMENTS

| | | |
|---|---|---|
| CN | 102571201 A | 7/2012 |
| CN | 103220020 A | 7/2013 |
| CN | 103905111 A | 7/2014 |
| CN | 103945285 A | 7/2014 |
| CN | 104020540 A | 9/2014 |
| CN | 104301143 A | 1/2015 |
| CN | 104967534 A | 10/2015 |
| CN | 105141437 A | 12/2015 |
| CN | 105227377 A | 1/2016 |
| CN | 105447539 A | 3/2016 |
| CN | 103516551 B | 7/2016 |
| CN | 106161064 A | 11/2016 |
| CN | 106162383 A | 11/2016 |
| CN | 106355227 A | 1/2017 |
| CN | 103957474 B | 8/2017 |
| CN | 107276672 A | 10/2017 |
| EP | 2000305 A2 | 12/2008 |
| EP | 2475204 A2 | 7/2012 |
| EP | 2800305 A1 | 11/2014 |
| RU | 2467482 C2 | 11/2012 |
| RU | 2518439 C2 | 6/2014 |

OTHER PUBLICATIONS

L.64 (Oct. 2012), ITU-T, Telecommunication Standardization Sector of ITU, Series L: Construction, Installation and Protection of Cables and Other Elements of Outside Plant, ID tag requirements for infrastructure and network elements management, 34 pages.

* cited by examiner

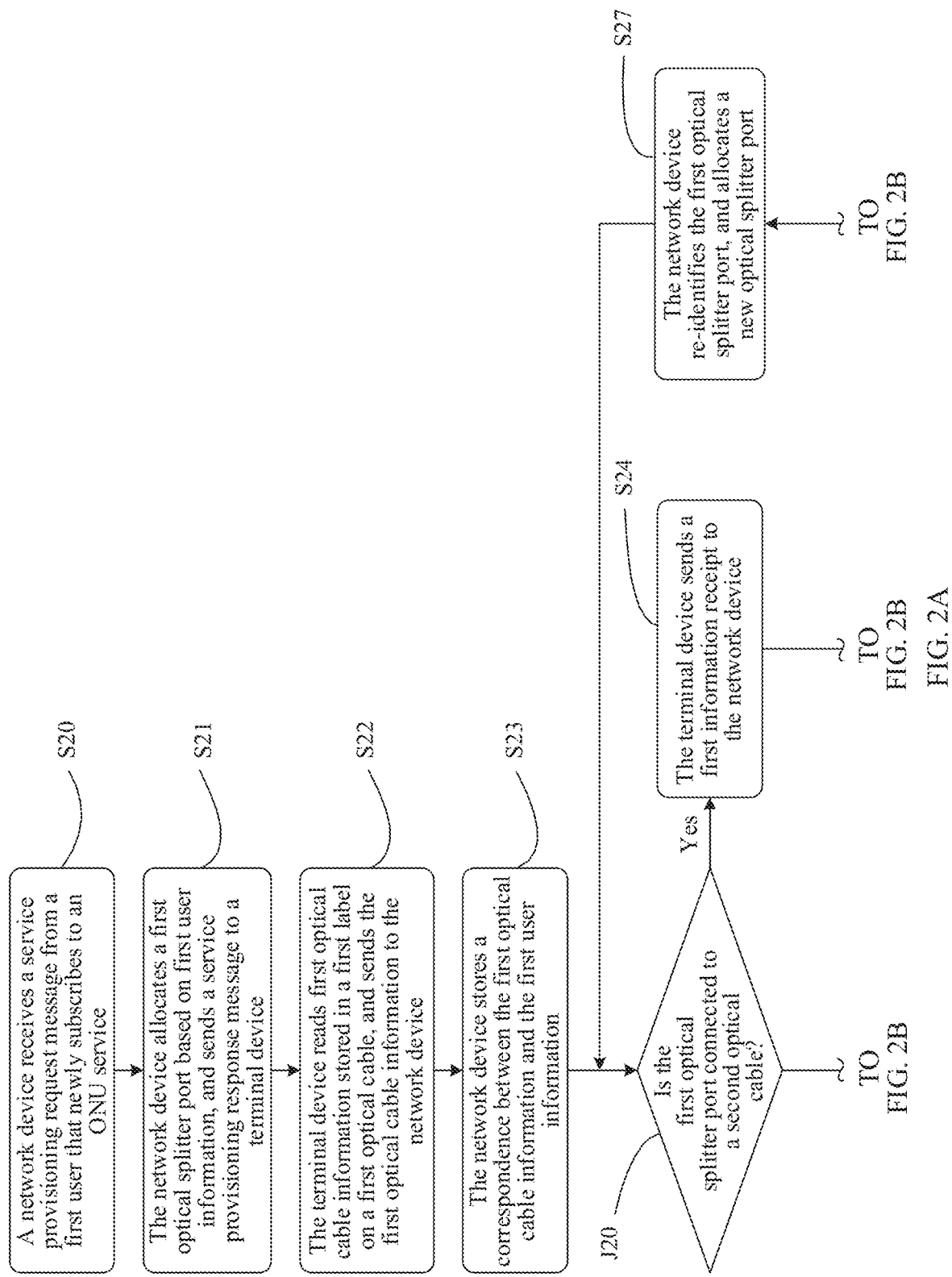

ated connection relationship usually occur. These problems cause a waste of a large quantity of resources and also hinder ODN construction. In addition, it is also seriously unfavorable to cloudification and intelligence of a communications network.

METHOD AND APPARATUS FOR ESTABLISHING OPTICAL CABLE CONNECTION

CROSS-REFERENCE TO RELATED APPLICATIONS

This application is a continuation of International Application No. PCT/CN2018/124598, filed on Dec. 28, 2018, the disclosure of which is hereby incorporated by reference in its entirety.

TECHNICAL FIELD

This application relates to the field of optical fiber communication, and in particular, to a method and an apparatus for establishing an optical cable connection.

BACKGROUND

As an optical fiber network expands rapidly in scale, passive optical network (Passive Optical Network, PON) technologies gradually become a hotspot of optical access network technologies. A structure of a PON system includes three parts: an optical line terminal (Optical Line Terminal, OLT), an optical distribution network (Optical Distribution Network, ODN), and an optical network unit (Optical Network Unit, ONU). The ODN mainly includes a plurality of optical fiber links, including an optical fiber and a one-level or multi-level optical splitter.

In a conventional optical fiber distribution network (Optical Distribution Network, ODN), carriers need to manage and maintain the following resources: optical fiber and device resources, port resources, and optical cable connections, which also include connection relationships between ports of devices. Only after these resources are well managed and maintained, better support can be given to ODN service provisioning, and an ODN fault can be accurately located and demarcated, thereby facilitating processing of the ODN fault. Therefore, in the optical distribution network, management and maintenance of ODN resources are a most important part for the carriers.

A current ODN is a passive network, all node devices are dumb resources, and therefore the ODN cannot be used to implement service transmission and network management or terminate service signals transmitted by using an optical fiber. The ODN itself features no management and maintenance functions, and therefore only depends on direct manual management and maintenance. After an optical splitter is installed in a fiber access terminal (FAT), location information and a device number of the optical splitter are manually recorded and retained. When a user needs to be connected to a port of the optical splitter in the FAT, a drop optical cable is used to connect the optical splitter to an ONU of the user, a paper nameplate or a paper label is prepared onsite and is used to record an account and an address of the user and other information, and the nameplate or label is placed on the drop optical cable close to the port of the optical splitter. Information such as an SN (Serial Number, serial number) of the corresponding ONU is recorded at the user's home, a current connection relationship between the optical splitter and the ONU is manually recorded, and the recorded information is uploaded into a resource management system.

However, the paper nameplate or the paper label prepared onsite has poor quality due to environmental limitations, and is vulnerable to discoloration and damage due to long-time external exposure. The current connection relationship between the optical splitter and the ONU is manually recorded, and a manual error is probably introduced. In an actual operation, a case in which a port specified in a work order is in an "occupied" or "damaged" state usually occur. In this case, a construction engineer onsite manually changes the port or changes a connected fiber access terminal resource point. However, in a service provisioning process, a system cannot automatically discover and verify whether the port is still available, and consequently inconsistency between an actual connection relationship and a record

SUMMARY

In view of this, this application provides a method and an apparatus for establishing an optical cable relationship, so that optical cable connection information and optical splitter port resource information can be accurately updated, to greatly reduce an optical cable connection error rate, and save optical fiber resources.

According to a first aspect, this application provides a method for establishing an optical cable connection. It should be noted that, a terminal device provided in the method is a terminal device used by a construction engineer who is responsible for installing an optical cable and who is arranged by a carrier. The method for establishing an optical cable connection provided in this application includes:

receiving, by a network device, a service provisioning request message including first user device information, where the first user device information includes an address of a first user device for which a service needs to be provisioned;

allocating, by the network device, a first optical splitter port based on the first user device information, where the first optical splitter port is installed on an optical splitter;

sending, by the network device, a first service provisioning response message to a terminal device, where the first service provisioning response message includes the first user device information and the first port information, and the first port information includes a first port identifier used to indicate the allocated first optical splitter port;

receiving, by the network device, an optical cable installation complete indication message sent by the terminal device, where the optical cable installation complete indication message carries the first port identifier, the first user device information, and a first optical cable identifier, and the first optical cable identifier is used to indicate a first optical cable corresponding to the first user device information; and storing, by the network device, a correspondence between the first optical cable identifier, the first port identifier, and the first user device information.

In a first possible implementation of the first aspect, before the allocating, by the network device, a first optical splitter port based on the first user device information, the method further includes:

allocating, by the network device, a second optical splitter port based on the first user device information, where the second optical splitter port is installed on the optical splitter;

sending, by the network device, a second service provisioning response message to the terminal device, where the second service provisioning response message includes the first user device information and second port information, and the second port information includes a second port identifier used to indicate the allocated second optical splitter port; and receiving, by the network device, an error indication message, where the error indication message indicates that the second optical splitter port is occupied by a second user, and the second user is in an active state.

With reference to the first aspect or the first possible implementation of the first aspect, in a second possible implementation of the first aspect, before the allocating, by the network device, a first optical splitter port based on the first user device information, the method further includes:

allocating, by the network device, a third optical splitter port based on the first user device information, where the third optical splitter port is installed on the optical splitter;

sending, by the network device, a third service provisioning response message to the terminal device, where the third service provisioning response message includes the first user device information and third port information, and the third port information includes a third port identifier used to indicate the allocated second optical splitter port; and receiving, by the network device, the error indication message, where the error indication message indicates that the third optical splitter port is in a fault state.

With reference to any one of the first aspect or the first and the second possible implementations of the first aspect, in a third possible implementation of the first aspect, the allocating, by the network device, a first optical splitter port based on the first user device information includes:

searching, by the network device, the first user device information for a plurality of fiber access terminals near the address of the first user device;

determining, by the network device, a fiber access terminal that has a shortest distance from the address of the first user device and that includes an idle optical splitter port, where the idle optical splitter port is an optical splitter port that has not been allocated to another user; and determining, by the network device, an optical splitter port from the idle optical splitter port as the first optical splitter port.

With reference to any one of the first aspect or the first to the third possible implementations of the first aspect, in a fourth possible implementation of the first aspect, the first port information further includes an address of the optical splitter in which the first optical splitter port is located.

With reference to any one of the first aspect or the first to the fourth possible implementations of the first aspect, in a fifth possible implementation of the first aspect, after the storing, by the network device, a correspondence between the first optical cable identifier, the first port identifier, and the first user device information, the method further includes:

identifying, by the network device, the first optical splitter port as an "in use" state.

With reference to any one of the first aspect or the first to the fifth possible implementations of the first aspect, in a sixth possible implementation of the first aspect, after the storing, by the network device, a correspondence between the first optical cable identifier, the first port identifier, and the first user device information, the method further includes:

receiving, by the network device, a service cancellation request message of the first user device, where the service cancellation request message includes the first user device information;

finding, by the network device based on the correspondence between the first optical cable identifier, the first port identifier, and the first user device information, the first optical cable identifier and the first port identifier that correspond to the first user device;

sending, by the network device, the service cancellation response message to the terminal device, where the service cancellation response message is used to instruct to cancel an ONU service of the first user device, and the service cancellation response message includes the first optical cable identifier and the first port identifier;

receiving, by the network device, a service cancellation complete message sent by the terminal device, where the service cancellation complete message indicates that a connection between the first optical cable and the first optical splitter port is disconnected; and deleting, by the network device, the correspondence between the first optical cable identifier, the first port identifier, and the first user device information.

With reference to any one of the first aspect or the first to the sixth possible implementations of the first aspect, in a seventh possible implementation of the first aspect, after the deleting, by the network device, the correspondence between the first optical cable identifier, the first port identifier, and the first user device information, the method further includes:

identifying, by the network device, the first optical splitter port as an "idle" state, where the "idle" state indicates that no optical cable is connected to the first optical splitter port and the optical splitter port is available.

With reference to any one of the first aspect or the first to the seventh possible implementations of the first aspect, in an eighth possible implementation of the first aspect, the first user device information further includes one or more of a name of the first user device, a service type that the first user device applies for, a network access account of the first user device, a phone number of the first user device, geographic information system GIS coordinates of the first user device, and a serial number SN of an optical network unit ONU that corresponds to the first user device.

According to a second aspect, this application provides a method for establishing an optical cable connection. It should be noted that, a terminal device provided in the method is a terminal device used by a construction engineer who is responsible for installing an optical cable and who is arranged by a carrier. The method for establishing an optical cable connection provided in this application includes:

sending, by the terminal device, a service provisioning request message including first user device information, where the first user device information includes an address of a first user device for which a service needs to be provisioned;

receiving, by the terminal device, a first service provisioning response message sent by the network device, where the first service provisioning response message includes the first user device information and first port information, and the first port information includes a first port identifier used to indicate a first optical splitter port;

obtaining, by the terminal device, a first optical cable identifier, where the first optical cable identifier corresponds to a first optical cable corresponding to the first user device information;

receiving, by the terminal device, a service provisioning complete message, wherein the service provisioning complete message indicates that an ONU service transmitted to the user through a connection between the first optical cable and the first port has been provisioned; and sending, by the terminal device, an optical cable installation complete indication message to the network device, where the optical cable installation complete indication message carries the first port identifier, the first user device information, and the first optical cable identifier.

In a first possible implementation of the second aspect, the obtaining, by the terminal device, a first optical cable identifier specifically includes:

reading, by the terminal device, a first label on the first optical cable to obtain the first optical cable identifier, where the first optical cable identifier is stored in the first label.

With reference to the second aspect or the first possible implementation of the second aspect, in a second possible implementation of the second aspect, before the receiving, by the terminal device, a first service provisioning response message sent by the network device, the method further includes:

receiving, by the terminal device, a second service provisioning response message sent by the network device, where the second service provisioning response message includes the first user device information and second port information, and the second port information includes a second port identifier used to indicate a second optical splitter port;

reading, by the terminal device, a second label on a second optical cable to obtain a second optical cable identifier, where the second optical cable identifier is used to indicate the second optical cable connected to the second optical splitter port; and sending, by the terminal device, an error indication message to the network device, where the error indication message carries the second optical cable identifier, and the error indication message is used to indicate that the second optical splitter port is occupied by the second optical cable.

With reference to any one of the second aspect or the first and the second possible implementations of the second aspect, in a third possible implementation of the second aspect, before the receiving, by the terminal device, a first service provisioning response message sent by the network device, the method further includes:

receiving, by the terminal device, a third service provisioning response message sent by the network device, where the third service provisioning response message includes the first user device information and third port information, and the third port information includes a third port identifier used to indicate a third optical splitter port;

generating, by the terminal device, an error indication message of the third optical splitter port; and sending, by the terminal device, the error indication message to the network device, where the error indication message indicates that the third optical splitter port is in a fault state.

With reference to any one of the second aspect or the first to the third possible implementations of the second aspect, in a fourth possible implementation of the second aspect, after the sending, by the terminal device, an optical cable installation complete indication message to the network device, the method further includes:

sending, by the terminal device, a service cancellation request message of the first user device to the network device, where the service cancellation request message includes the first user device information;

receiving, by the terminal device, a service cancellation response message sent by the network device, where the service cancellation response message is used to instruct to cancel an ONU service of the first user device, and the service cancellation response message includes the first optical cable identifier and the first port identifier; and sending, by the terminal device, a service cancellation complete message to the network device, where the service cancellation complete message is used to indicate that a connection between the first optical cable and the first optical splitter port is disconnected.

With reference to the second aspect or the first to the fourth possible implementations of the second aspect, in a fifth possible implementation of the second aspect, the first port information further includes an address of the optical splitter in which the first optical splitter port is located.

With reference to any one of the second aspect or the first to the fifth possible implementations of the second aspect, in a sixth possible implementation of the second aspect, the first user device information further includes one or more of a name of the first user device, a service type that the first user device applies for, a network access account of the first user device, a phone number of the first user device, geographic information system GIS coordinates of the first user device, and a serial number SN of an optical network unit ONU that corresponds to the first user device.

According to a third aspect, this application provides a network device, including: a receiver, a processor, a sender, and a memory, where the receiver is configured to receive a service provisioning request message including first user device information, where the first user device information includes an address of a first user device for which a service needs to be provisioned;

the processor is configured to allocate a first optical splitter port based on the first user device information, where the first optical splitter port is installed on an optical splitter;

the sender is configured to send a first service provisioning response message to the terminal device, where the first service provisioning response message includes the first user device information and the first port information, and the first port information includes a first port identifier used to indicate the allocated first optical splitter port;

the receiver is further configured to receive an optical cable installation complete indication message sent by the terminal device, where the optical cable installation complete indication message carries the first port identifier, the first user device information, and a first optical cable identifier, and the first optical cable identifier is used to indicate a first optical cable corresponding to the first user device information; and the memory is configured to store a correspondence between the first optical cable identifier, the first port identifier, and the first user device information.

In a first possible implementation of the third aspect, that the processor is configured to allocate a first optical splitter port based on the first user device information specifically includes:

searching, by the processor, the first user device information for a plurality of fiber access terminals near the address of the first user device;

determining, by the processor, a fiber access terminal that has a shortest distance from the address of the first user device and that includes an idle optical splitter port, where the idle optical splitter port is an optical splitter port that has not been allocated to another user; and determining, by the processor, an optical splitter port from the idle optical splitter port as the first optical splitter port.

With reference to the third aspect or the first possible implementation of the first aspect, in a second possible implementation of the third aspect, the processor is further configured to allocate a second optical splitter port based on the first user device information, where the second optical splitter port is installed on the optical splitter;

the sender is further configured to send a second service provisioning response message to the terminal device, where the second service provisioning response message includes the first user device information and second port information, and the second port information includes a second port identifier used to indicate the allocated second optical splitter port; and the receiver is further configured to receive an error indication message, where the error indication message indicates that the second optical splitter port is occupied by a second user, and the second user is in an active state.

With reference to any one of the third aspect or the first and the second possible implementations of the third aspect, in a third possible implementation of the third aspect, the processor is further configured to allocate a third optical splitter port based on the first user device information, where the third optical splitter port is installed on the optical splitter;

the sender is further configured to send a third service provisioning response message to the terminal device, where the third service provisioning response message includes the first user device information and third port information, and the third port information includes a third port identifier used to indicate the allocated second optical splitter port; and the receiver is further configured to receive an error indication message, where the error indication message indicates that the third optical splitter port is in a fault state.

With reference to any one of the third aspect or the first to the third possible implementations of the third aspect, in a fourth possible implementation of the third aspect, the receiver is further configured to receive a service cancellation request message, sent by the terminal device, of the first user device, where the service cancellation request message includes the first user device information;

the processor is further configured to find, based on the correspondence between the first optical cable identifier, the first port identifier, and the first user device information, the first optical cable identifier and the first port identifier that correspond to the first user device;

the sender is further configured to send the service cancellation response message to the terminal device, where the service cancellation response message is used to instruct to cancel an ONU service of the first user device, and the service cancellation response message includes the first optical cable identifier or the first port information;

the receiver is further configured to receive a service cancellation complete message sent by the terminal device, where the service cancellation complete message is used to indicate that a connection between the first optical cable and the first optical splitter port is disconnected; and the processor is further configured to delete the correspondence between the first optical cable identifier, the first port information, and the first user device information.

With reference to any one of the third aspect or the first to the fourth possible implementations of the third aspect, in a fifth possible implementation of the third aspect, the first port information further includes an address of the optical splitter in which the first optical splitter port is located.

With reference to any one of the third aspect or the first to the fifth possible implementations of the third aspect, in a sixth possible implementation of the third aspect, the first user device information further includes one or more of a name of the first user device, a service type that the first user device applies for, a network access account of the first user device, a phone number of the first user device, geographic information system GIS coordinates of the first user device, and a serial number SN of an optical network unit ONU that corresponds to the first user device.

According to a fourth aspect, this application provides a terminal device. The terminal device herein is a terminal device used by a construction engineer who is responsible for installing an optical cable and who is arranged by a carrier. The terminal device includes: a receiver, a sender, and a reader, where the sender is configured to send a service provisioning request message including first user device information, where the first user device information includes an address of a first user device for which a service needs to be provisioned;

the receiver is configured to receive a first service provisioning response message sent by the network device, where the first service provisioning response message includes the first user device information and first port information, and the first port information includes a first port identifier used to indicate a first optical splitter port;

the reader is configured to obtain a first optical cable identifier, where the first optical cable identifier corresponds to a first optical cable corresponding to the first user device information;

the receiver is further configured to receive a service provisioning complete message, wherein the service provisioning complete message indicates that an ONU service transmitted to the user through a connection between the first optical cable and the first port has been provisioned; and the sender is further configured to send an optical cable installation complete indication message to the network device, where the optical cable installation complete indication message carries the first port identifier, the first user device information, and the first optical cable identifier.

In a first possible implementation of the fourth aspect, that the reader is configured to obtain a first optical cable identifier specifically includes:

reading, by the reader, a first label on the first optical cable to obtain the first optical cable identifier, where the first optical cable identifier is stored in the first label.

With reference to the fourth aspect or the first possible implementation of the fourth aspect, in a second possible implementation of the fourth aspect, the following is further included:

the receiver is further configured to receive a second service provisioning response message sent by the network device, where the second service provisioning response message includes the first user device information and second port information, and the second port information includes a second port identifier used to indicate a second optical splitter port;

the reader is further configured to read a second label on a second optical cable to obtain a second optical cable identifier, where the second optical cable identifier is used to indicate the second optical cable connected to the second optical splitter port; and the sender is further configured to send an error indication message to the network device, where the error indication message carries the second optical cable identifier, and the error indication message is used to indicate that the second optical splitter port is occupied by the second optical cable.

With reference to any one of the fourth aspect or the first to the second possible implementations of the fourth aspect, in a third possible implementation of the fourth aspect, the terminal device further includes a processor, where the receiver is further configured to receive a third service provisioning response message sent by the network device, where the third service provisioning response message includes the first user device information and third port information, and the third port information includes a third port identifier used to indicate a third optical splitter port;

the processor is configured to generate an error indication message of the third optical splitter port; and the sender is further configured to send the error indication message to the network device, where the error indication message indicates that the third optical splitter port is in a fault state.

With reference to any one of the fourth aspect or the first to the third possible implementations of the fourth aspect, in a fourth possible implementation of the fourth aspect, the following is further included:

the sender is further configured to send a service cancellation request message of the first user device to the network device, where the service cancellation request message includes the first user device information;

the receiver is further configured to receive a service cancellation response message sent by the network device, where the service cancellation response message is used to instruct to cancel an ONU service of the first user device, and the service cancellation response message includes the first optical cable identifier or the first port information; and the sender is further configured to send a service cancellation complete message to the network device, where the service cancellation complete message is used to indicate that a connection between the first optical cable and the first optical splitter port is disconnected.

With reference to any one of the fourth aspect or the first to the fourth possible implementations of the fourth aspect, in a fifth possible implementation of the fourth aspect, the first port information further includes an address of the optical splitter in which the first optical splitter port is located.

With reference to any one of the fourth aspect or the first to the fifth possible implementations of the fourth aspect, in a sixth possible implementation of the fourth aspect, the first user device information further includes one or more of a name of the first user device, a service type that the first user device applies for, a network access account of the first user device, a phone number of the first user device, geographic information system GIS coordinates of the first user device, and a serial number SN of an optical network unit ONU that corresponds to the first user device.

According to a fifth aspect, this application provides a network device, including: a receiving module, a processing module, a sending module, and a storage module, where the receiving module is configured to receive a service provisioning request message including first user device information, where the first user device information includes an address of a first user device for which a service needs to be provisioned;

the processing module is configured to allocate a first optical splitter port based on the first user device information, where the first optical splitter port is installed on an optical splitter;

the sending module is configured to send a first service provisioning response message to the terminal device, where the first service provisioning response message includes the first user device information and the first port information, and the first port information includes a first port identifier used to indicate the allocated first optical splitter port;

the receiving module is further configured to receive an optical cable installation complete indication message sent by the terminal device, where the optical cable installation complete indication message carries the first port identifier, the first user device information, and a first optical cable identifier, and the first optical cable identifier is used to indicate a first optical cable corresponding to the first user device information; and the storage module is configured to store a correspondence between the first optical cable identifier, the first port identifier, and the first user device information.

In a first possible implementation of the fifth aspect, that the processing module is configured to allocate a first optical splitter port based on the first user device information specifically includes:

searching, by the processing module, the first user device information for a plurality of fiber access terminals near the address of the first user device;

determining, by the processing module, a fiber access terminal that has a shortest distance from the address of the first user device and that includes an idle optical splitter port, where the idle optical splitter port is an optical splitter port that has not been allocated to another user; and determining, by the processing module, an optical splitter port from the idle optical splitter port as the first optical splitter port.

With reference to any one of the fifth aspect or the first possible implementation of the first aspect, in a second possible implementation of the fifth aspect, the processing module is further configured to allocate a second optical splitter port based on the first user device information, where the second optical splitter port is installed on the optical splitter;

the sending module is further configured to send a second service provisioning response message to the terminal device, where the second service provisioning response message includes the first user device information and second port information, and the second port information includes a second port identifier used to indicate the allocated second optical splitter port; and the receiving module is further configured to receive an error indication message, where the error indication message indicates that the second optical splitter port is occupied by a second user, and the second user is in an active state.

With reference to the fifth aspect and the first to the second possible implementations of the fifth aspect, in a third possible implementation of the fifth aspect, the processing module is further configured to allocate a third optical splitter port based on the first user device information, where the third optical splitter port is installed on the optical splitter;

the sending module is further configured to send a third service provisioning response message to the terminal device, where the third service provisioning response message includes the first user device information and third port information, and the third port information includes a third port identifier used to indicate the allocated second optical splitter port; and the receiving module is further configured to receive an error indication message, where the error indication message indicates that the third optical splitter port is in a fault state.

With reference to any one of the fifth aspect or the first to the third possible implementations of the fifth aspect, in a fourth possible implementation of the fifth aspect, the receiving module is further configured to receive a service cancellation request message, sent by the terminal device, of the first user device, where the service cancellation request message includes the first user device information;

the processing module is further configured to find, based on the correspondence between the first optical cable identifier, the first port identifier, and the first user device information, the first optical cable identifier and the first port identifier that correspond to the first user device;

the sending module is further configured to send the service cancellation response message to the terminal device, where the service cancellation response message is used to instruct to cancel an ONU service of the first user device, and the service cancellation response message includes the first optical cable identifier or the first port information;

the receiving module is further configured to receive a service cancellation complete message sent by the terminal device, where the service cancellation complete message is used to indicate that a connection between the first optical cable and the first optical splitter port is disconnected; and the processing module is further configured to delete the correspondence between the first optical cable identifier, the first port information, and the first user device information.

With reference to any one of the fifth aspect or the first to the fourth possible implementations of the fifth aspect, in a fifth possible implementation of the fifth aspect, the first port information further includes an address of the optical splitter in which the first optical splitter port is located.

With reference to any one of the fifth aspect or the first to the fifth possible implementations of the fifth aspect, in a sixth possible implementation of the fifth aspect, the first user device information further includes one or more of a name of the first user device, a service type that the first user device applies for, a network access account of the first user device, a phone number of the first user device, geographic information system GIS coordinates of the first user device, and a serial number SN of an optical network unit ONU that corresponds to the first user device.

According to a sixth aspect, this application provides a terminal device. The terminal device herein is a terminal device used by a construction engineer who is responsible for installing an optical cable and who is arranged by a carrier. The terminal device includes: a receiving module, a sending module, and a reading module, where the sending module is configured to send a service provisioning request message including first user device information, where the first user device information includes an address of a first user device for which a service needs to be provisioned;

the receiving module is configured to receive a first service provisioning response message sent by a network device, where the first service provisioning response message includes the first user device information and first port information, and the first port information includes a first port identifier used to indicate a first optical splitter port;

the reading module is configured to obtain a first optical cable identifier, where the first optical cable identifier corresponds to a first optical cable corresponding to the first user device information;

the receiving module is further configured to receive a service provisioning complete message, wherein the service provisioning complete message indicates that an ONU service transmitted to the user through a connection between the first optical cable and the first port has been provisioned; and the sending module is further configured to send an optical cable installation complete indication message to the network device, where the optical cable installation complete indication message carries the first port identifier, the first user device information, and the first optical cable identifier.

In a first possible implementation of the sixth aspect, that the reading module is configured to obtain a first optical cable identifier specifically includes:

reading, by the reading module, a first label on the first optical cable to obtain the first optical cable identifier, where the first optical cable identifier is stored in the first label.

With reference to the sixth aspect or the first possible implementation of the sixth aspect, in a second possible implementation of the sixth aspect, the following is further included:

the receiving module is further configured to receive a second service provisioning response message sent by the network device, where the second service provisioning response message includes the first user device information and second port information, and the second port information includes a second port identifier used to indicate a second optical splitter port;

the reading module is further configured to read a second label on a second optical cable to obtain a second optical cable identifier, where the second optical cable identifier is used to indicate the second optical cable connected to the second optical splitter port; and the sending module is further configured to send an error indication message to the network device, where the error indication message carries the second optical cable identifier, and the error indication message is used to indicate that the second optical splitter port is occupied by the second optical cable.

With reference to any one of the sixth aspect or the first and the second possible implementations of the sixth aspect, in a third possible implementation of the sixth aspect, the terminal device further includes a processing module, where the receiving module is further configured to receive a third service provisioning response message sent by the network device, where the third service provisioning response message includes the first user device information and third port information, and the third port information includes a third port identifier used to indicate a third optical splitter port;

the processing module is configured to generate an error indication message of the third optical splitter port; and the sending module is further configured to send the error indication message to the network device, where the error indication message indicates that the third optical splitter port is in a fault state.

With reference to any one of the sixth aspect or the first to the third possible implementations of the sixth aspect, in a fourth possible implementation of the sixth aspect, the following is further included:

the sending module is further configured to send a service cancellation request message of the first user device to the network device, where the service cancellation request message includes the first user device information;

the receiving module is further configured to receive a service cancellation response message sent by the network device, where the service cancellation response message is used to instruct to cancel an ONU service of the first user device, and the service cancellation response message includes the first optical cable identifier or the first port information; and the sending module is further configured to send a service cancellation complete message to the network device, where the service cancellation complete message is used to indicate that a connection between the first optical cable and the first optical splitter port is disconnected.

With reference to any one of the sixth aspect or the first to the fourth possible implementations of the sixth aspect, in a fifth possible implementation of the sixth aspect, the first port information further includes an address of the optical splitter in which the first optical splitter port is located.

With reference to any one of the sixth aspect or the first to the fifth possible implementations of the sixth aspect, in a sixth possible implementation of the sixth aspect, the first user device information further includes one or more of a name of the first user device, a service type that the first user device applies for, a network access account of the first user device, a phone number of the first user device, geographic information system GIS coordinates of the first user device, and a serial number SN of an optical network unit ONU that corresponds to the first user device.

According to a seventh aspect, an embodiment provides a computer-readable storage medium. The computer-readable storage medium stores a computer program instruction, and when the computer program instruction is executed by a computer, the method in any one of the foregoing embodiments is implemented.

According to an eighth aspect, an embodiment further provides a computer program product. When the computer program product is executed by a computer, the method in any one of the foregoing embodiments is implemented.

According to a ninth aspect, an embodiment further provides a system chip. The system chip includes a processing unit and a communications unit. The processing unit may be, for example, a processor. The communications unit may be, for example, an input/output interface, a pin, a circuit, or the like. The processing unit may execute a computer instruction, so that a chip in the communications apparatus performs the method provided in any one of the foregoing embodiments.

The embodiments provide the method and the apparatus for establishing an optical cable connection. An optical cable connected to a user is identified, an optical splitter port connected to the optical cable is identified, and a connection relationship between the user, the optical cable of the user, and the optical splitter port is accurately stored. This resolves problems that recorded information is incorrect, a port resource is wasted, information is not updated in time, and an optical cable connection is incorrect because uploaded information related to the optical cable connection is manually recorded by using the existing optical fiber connection allocation technology, thereby greatly reducing an optical cable connection error rate, facilitating service provisioning for a user, saving optical fiber resources, and saving costs of regularly arranging ODN resource information.

BRIEF DESCRIPTION OF DRAWINGS

To describe the technical solutions in the embodiments or in the prior art more clearly, the following briefly describes the accompanying drawings required for describing the background and the embodiments. It is clearly that the accompanying drawings in the following description show merely some embodiments, and a person of ordinary skill in the art may still derive other accompanying drawings or embodiments according to these drawings or description without creative efforts, and this application aims to cover all these derived accompanying drawings or embodiments.

FIG. 2A and FIG. 2B are a flowchart of a method for establishing an optical cable connection according to a first embodiment;

DESCRIPTION OF EMBODIMENTS

To make the objectives, technical solutions, and advantages of this application more clearly and more comprehensible, the following further describes this application in detail with reference to the accompanying drawings and the embodiments. It should be understood that the specific embodiments described herein are merely used to explain this application but are not intended to limit this application. It is clearly that the described embodiments are merely some but not all of the embodiments. All other embodiments obtained by a person of ordinary skill in the art based on the embodiments without creative efforts shall fall within the protection scope of this application.

Figure 1:
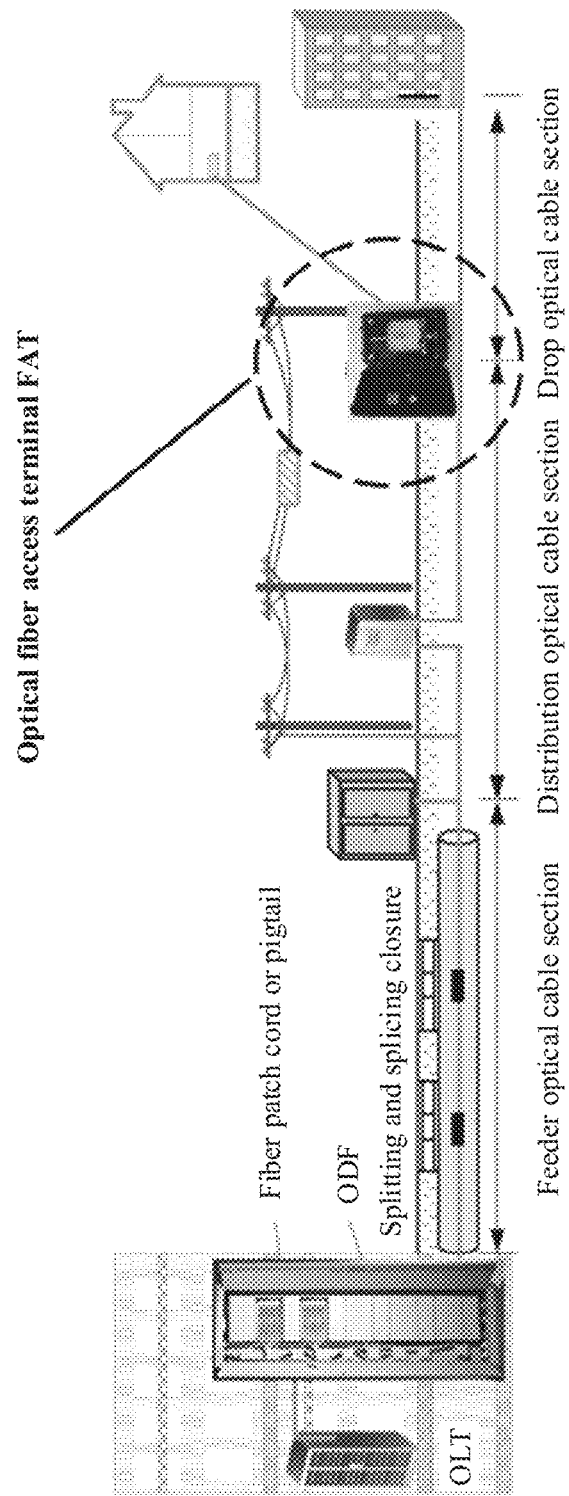
FIG. 1 is a schematic diagram of an optical distribution network system in the prior art.

FIG. 1 is a schematic diagram of an optical distribution network system in the prior art. As shown in FIG. 1, an optical distribution network includes a drop optical cable section, a distribution optical cable section, and a feeder optical cable section. An optical fiber access terminal (FAT) is located at a user access point in a PON optical access network, and is between the distribution optical cable section and the drop optical cable section. An optical splitter device is usually installed in the FAT, and commonly used split ratios of the optical splitter are 1:4, 1:8, 1:16, and the like, to implement joint and protection functions of a distribution optical fiber and a drop optical fiber. A fiber patch cord or a pigtail, an OLT (Optical Line Terminal, optical line terminal), and the like are connected to the feeder optical cable section.

The optical splitter is an important passive component in an optical distribution network link. The optical splitter implements functions of splitting and combining optical signals, and is usually used for distribution of optical signals, connection of optical paths, control of an optical signal transmission direction, coupling control between devices, and the like. An ONU is a form of an access node, converts an optical signal sent by using an optical cable into an electrical signal, and then transmits the electrical signal to each client by using a coaxial cable or the like.

In a PON network construction process, a construction engineer needs to record a large amount of related information, including optical fiber and device resource information, port resource information, and optical cable connection information.

The optical fiber and device resource information includes a device model of the FAT, a vendor of the FAT, a location of the FAT, GIS (Geographic Information System or Geo-Information system, geographic information system) coordinates, a model of the optical splitter, and a split ratio of the optical splitter. In addition, the optical fiber and device resource information further includes a number of an optical splitter port connected to a drop optical cable and information such as a name, an account, and a phone number that are of an end user. The recorded information is of various types, and a large amount of information needs to be manually input, which is vulnerable to errors during manual recording and transferring of device assets.

The port resource information includes information about an available port in the FAT. Each port of the optical splitter in the FAT is a line resource of a carrier, and needs to be fully utilized. When the FAT is connected to a new subscriber, a port resource of the FAT is occupied. As described above, if there is anew subscriber, optical fiber and device resource information needs to be recorded in a reported port connection relationship. The information is mainly manually input and recorded, and is vulnerable to errors. Consequently, the reported information is inconsistent with an actual connection relationship in a live network. However, when a service is provisioned in an equipment room, a network management system cannot verify whether information reported by an onsite engineer is correct. As time elapses, a quantity of large available ports in the FAT is incorrect. When there is a new FTTH (Fiber To The Home, fiber to the home) subscriber, an occupied physical port is allocated to the new subscriber, causing incorrect dispatching. In addition, optical fiber resources are incorrectly counted during resource sorting.

The optical cable connection information includes an optical fiber routing topology from the FAT to the ONU. After a live network user applies for unsubscribing to a network, a carrier needs to remove an optical fiber connected from the user to an FAT port, to reclaim the optical fiber resource. If an optical cable connected to an online user is mistakenly removed, a network outage may occur on the online user, causing user complaints. Because the connection relationship between the FAT and the ONU recorded during a service provisioning phase may be incorrect, a construction engineer probably removes the optical fiber mistakenly. Therefore, all construction engineers usually choose not to remove the optical fiber of the user that unsubscribes to the network, and consequently user service cancellation without fiber removal occur, causing a waste of optical fiber resources at an FTTH drop optical cable section.

In an optical communications system, port status information (such as occupied, idle, and optical fiber routing) of each optical fiber adapter that is connected to a pigtail or a fiber patch cord in an optical fiber connection apparatus needs to be accurately marked, to facilitate subsequent provisioning and maintenance of a new service. For a current existing optical fiber connection identifier and connection relationship system, a port connection relationship of an optical fiber adapter can be marked only based on information such as an account and an address that are of a user recorded on a paper nameplate or a paper label, and can be identified only by manually recording and searching. The paper nameplate or the paper label is vulnerable to damage. Moreover, in an actual use process, optical cable connection information and topology connection information usually need to be updated when a service changes, and it is inconvenient to update the connection relationship information in time by using the paper nameplate or the paper label. Consequently, a large quantity of errors of optical cable connections and a waste of optical network resources are also caused. In addition, due to the large quantity of errors of optical cable connections, a network management system cannot quickly provision a service and rectify a fault for a user, causing user dissatisfaction.

To resolve problems that recorded information is incorrect, a port resource is wasted, information is not updated in time, and an optical cable connection is inaccurate because information related to the optical cable connection is manually recorded by using an existing optical fiber connection allocation technology, this application provides a method and a system apparatus for intelligently establishing an optical cable connection and a physical topology relationship, so that optical fiber connection status information can be accurately updated, an optical cable connection error rate is greatly reduced, and optical fiber resources are saved.

The terminal device includes a mobile phone, a tablet computer, a portable notebook computer, a virtual/hybrid/augmented reality device, a navigation device, a session initiation protocol (Session Initiation Protocol, SIP) phone, a wireless local loop (Wireless Local Loop, WLL) station, a personal digital processing (Personal Digital Assistant, PDA), a handheld device with a wireless communication function, a computing device, or another processing device connected to a wireless modem, a vehicle-mounted device, a wearable device; a terminal device in a 5G network, a terminal device in a future evolved public land mobile communications network (Public Land Mobile Network, PLMN) or another future communications system, or the like. This is not limited in this application.

In addition, the terminal device provided in the embodiments is a terminal device used by a construction engineer who is responsible for installing an optical cable and who is arranged by a carrier.

Figure 2B:
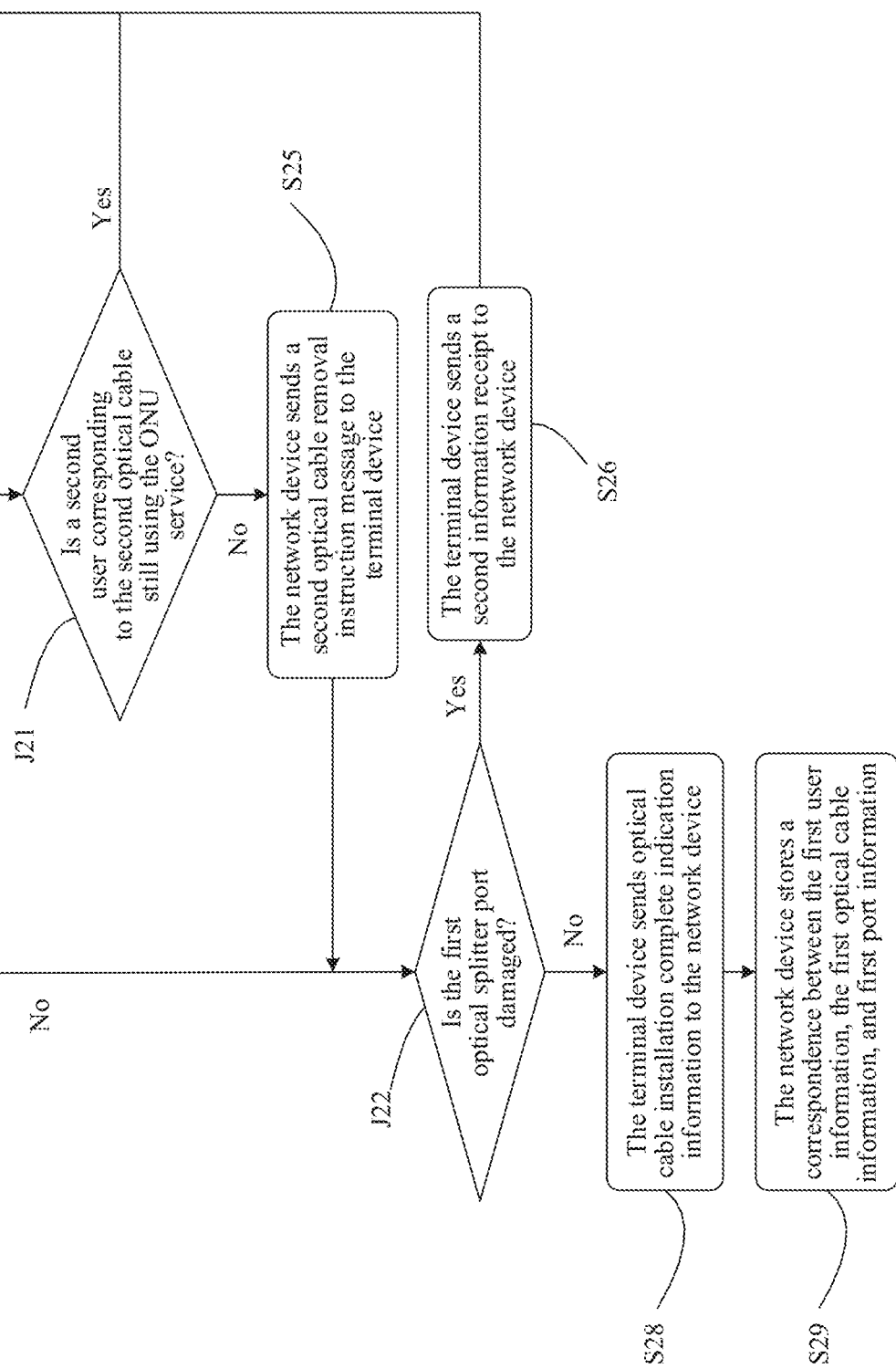

A first embodiment provides a method for establishing an optical cable connection. FIG. 2A and FIG. 2B show the method for establishing the optical cable connection. The method is performed by a network device and a terminal device. The network device includes a resource management system and a network management system.

In the method for establishing an optical cable connection, steps with step numbers starting with "S" represent steps for execution, and steps with step numbers starting with "J" represent steps for determining. The method includes the following steps:

S20: The network device receives a service provisioning request message from a first user device that newly subscribes to an ONU service, and then performs S21.

The network device processes the service provisioning request message of the first user device for subscribing to the ONU service, and allocates an access network account to the first user device. The service provisioning request message includes first user device information of the first user device. The network device receives and stores the first user device information of the first user device, wherein the first user device information includes an address of the first user device.

Further, the first user device information may include a user name, a service type that is applied for, a network access account, a phone number, GIS coordinates, and an SN number of an ONU.

S21: The network device allocates a first optical splitter port based on the first user device information, and sends a service provisioning response message to the terminal device. Then S22 is performed.

The network device stores a port database, and the network device identifies a use status of each optical splitter port based on an actual use status of the port, and stores an identification result in the port database. A use status identifier of an optical splitter port includes the following four types: an "in use" identifier, where an optical splitter port corresponding to the identifier is connected to a user and an optical cable, and the user is currently using an ONU service; an "idle" identifier, where an optical splitter port corresponding to the identifier is not connected to a user or an optical cable, and the port is still available; a "to be removed" identifier, where an optical splitter port corresponding to the identifier is connected to an optical cable of a user, but the user has unsubscribed to an ONU service, and the optical cable of the user waits for being removed; and a "damaged" identifier, where an optical splitter port corresponding to the identifier has been damaged and needs to be repaired subsequently.

After receiving the first user device information, the network device allocates the first optical splitter port to the first user device based on the first user device information and the port database that is in the network device, where the first optical splitter port is an optical splitter port in an "idle" identifier state, and retrieves, from the port database, first port information corresponding to the first optical splitter port. The first port information includes an identifier of the first optical splitter port, where the identifier is used to indicate the allocated first optical splitter port.

Optionally, the first port information may further include a port number of the first optical splitter port, and a serial number and an address of an optical splitter in which the first optical splitter port is located.

Herein, the process of allocating the first optical splitter port by the network device includes the following steps:

The network device searches the first user device information for the address of the first user device.

The network device searches for a plurality of fiber access terminals near the address of the first user device.

The network device sorts the plurality of fiber access terminals in ascending order based on distances between the plurality of fiber access terminals and the user address.

The network device finds a fiber access terminal that has a shortest distance and that includes an optical splitter port with an "idle" identifier;

The network device selects one from the optical splitter port with the "idle" identifier as the first optical splitter port; and The network device searches for the first port information corresponding to the first optical splitter port.

The network device delivers an ONU service provisioning order of a new user, that is, the service provisioning response message, so that a construction engineer installs a drop optical cable for the new user based on the service provisioning response message. The service provisioning response message includes the first user device information and the first port information. The service provisioning response message is directly sent to the terminal device of the construction engineer. The terminal device has a function of communicating with the network device.

S22: The terminal device reads first optical cable information stored in a first label on a first optical cable, and sends the first optical cable information to the network device. Then S23 is performed.

Each new subscriber is provided with a specified optical cable. The first user device corresponds to a first optical cable, the first optical cable has the first label, the first optical cable information is stored in the first label, and the first optical cable is in a one-to-one correspondence with the first optical cable information.

Specifically, the terminal device may obtain, by reading the first label, the first optical cable information stored in the first label. After obtaining the first optical cable information, the terminal device sends the first optical cable information to the network device. The first optical cable information includes a first optical cable identifier, and the first optical cable identifier is used to indicate the first optical cable corresponding to the first user device.

Optionally, the first optical cable identifier includes a serial number of the first optical cable.

Herein, the first label includes a barcode, a two-dimensional code, an RFID (Radio Frequency Identification, radio frequency identification) label, and an NFC (Near Field Communication, near field communication) label.

The barcode (barcode) is a graphic identifier used to convey a group of information by arranging black bars and blank areas with varying widths according to a coding rule. A common barcode is a parallel pattern obtained by arranging black bars and white bars for which a difference between refractive indexes is relatively large. The barcode can be used to mark a production country, a manufacturer, a product name, a production date, a book classification number, source and destination addresses of an email, a category, a date, and other information of a product.

A two-dimensional barcode (2-dimensional barcode, 2-dimensional barcode) records data symbol information by using a pepper-and-salt pattern in which geometric patterns of a specific type are distributed on a plane (in a two-dimensional direction) according to a rule. In coding, a concept of "0" and "1" bit streams that constitute an internal logic basis of a computer is skillfully utilized, several geometric shapes corresponding to a binary system are used to represent text and numerical value information, and automatic information processing is implemented through automatic reading by using an image input device or an optoelectronic scanning device. The two-dimensional barcode has some commonalities with a barcode technology: Each code system has its given character set; each character occupies a width; and the two-dimensional barcode has a check function. In addition, the two-dimensional barcode also has functions of automatically identifying information in different rows, and processing a graph rotation change point.

The RFID is a non-contact identification technology, and is classified into two types: active RFID and passive RFID.

A main working principle of the RFID is that, an RFID reader sends a radio frequency signal, and generates a signal by passing through a coil of an electronic tag; and the reader reads and decodes information, thereby completing an entire identification process. Generally, an active label (an active label) may actively send a signal. An RFID system mainly includes a reader (Reader) and a transponder (Transponder). The RFID system automatically identifies a target object and obtains related data by using a radio frequency signal, where the identification work does not require manual intervention, and therefore the RFID system can be used in various severe environments. The RFID technology can be used to identify a high-speed moving object and can simultaneously identify a plurality of tags. Such an operation is quick and convenient to perform. An RFID tag further has a function of storing data. A user can encode the tag as required, and can access information without network connection. Data written into a tag can also be modified whenever at a database end or at a moment of reading and writing the tag.

Generally, RFID includes three parts: a system higher layer, a reader/writer, and an electronic tag. The system higher layer generally receives information transmitted by the reader/writer, can mutually transfer data with the reader/writer, and stores received information. A user can obtain required information by using the system higher layer. A function of the reader/writer is to read, by using an antenna apparatus, information stored in an electronic tag, and transfer the information obtained through reading to the system higher layer. Electronic tags are classified into two types: an active electronic tag and a passive electronic tag. A function of the electronic tag is mainly to access target-specific information, and to implement information transmission with the reader/writer. A working principle of the RFID technology is that, the reader/writer sends a radio frequency signal by using the antenna apparatus; when the electronic tag is within a range of the radio frequency signal sent by the reader/writer, the electronic tag obtains energy from a current generated through induction, and in this case, the electronic tag is activated; the activated electronic tag transmits a signal to the reader/writer, where the signal may be received by the reader/writer; the reader/writer decodes obtained information and transmits the decoded information to the system higher layer; and the system higher layer manages the received information.

An NFC communications technology is a near field communications technology. Currently, NFC is a very common communications interface in various smart phones. A manner of exchanging data of NFC is to connect intelligent devices by placing the devices together. An NFC device may also communicate with a passive NFC tag, and such a communication manner is the same as that of RFID. The NFC technology evolves from the RFID technology, and an NFC standard stipulates a communication protocol and a data exchange format. Generally, an NFC chip is integrated with an inductive card reader, a point-to-point function, and an inductive card function, and identification, connection, and data exchange can be performed with a compatible device within a short range.

S23: The network device stores a correspondence between the first optical cable information and the first user device information. Then J20 is performed.

After receiving the first optical cable information sent by the terminal device, the network device binds the first optical cable information to the first user device information. The first user device information is in a one-to-one correspondence with the first optical cable information, and stores the correspondence.

J20: Determine whether the first optical splitter port is connected to a second optical cable. If yes, go to S24; or if no, go to J22.

The construction engineer checks whether the first optical splitter port is connected to the second optical cable, where the second optical cable is an optical cable that is connected to the first optical splitter port before S21 is performed.

S24: The terminal device sends a first information receipt to the network device. Then J21 is performed.

After identifying that the first optical splitter port is connected to the second optical cable, the terminal device sends the first information receipt to the network device, and reports, to the network device, the information that the first optical splitter port is connected to the second optical cable. The first information receipt includes a second optical cable identifier, and the second optical cable identifier is used to indicate the second optical cable.

Optionally, the first information receipt may further include a port number of the first optical splitter port, and a serial number and an address of the optical splitter in which the first optical splitter port is located.

Optionally, the second optical cable identifier includes a second optical cable serial number.

Specifically, the terminal device obtains second optical cable information by reading a second label on the second optical cable. There is the second label on the second optical cable, the second optical cable information is stored in the second label, the second optical cable information includes a serial number of the second optical cable, and the second optical cable is in a one-to-one correspondence with the second optical cable information.

J21: Determine whether a second user corresponding to the second optical cable is still using the ONU service. If yes, go to S27; or if no, go to S25.

After receiving the first information receipt, the network device queries, based on the first information receipt, whether the second user corresponding to the second optical cable identifier is still using the ONU service.

S25: The network device sends a second optical cable removal instruction message to the terminal device, to notify that the second user corresponding to the second optical cable is not using the ONU service, and the construction engineer may remove the second optical cable. Then J22 is performed.

J22: Determine whether the first optical splitter port is damaged. If yes, go to S26; or if no, go to S28.

The construction engineer checks whether the first optical splitter port is damaged.

S26: The terminal device sends a second information receipt to the network device. Then S27 is performed.

If it is checked that the first optical splitter port is damaged and cannot continue to be used, the terminal device sends the second information receipt to the network device, and reports, to the network device, the information that the first optical splitter port is damaged and cannot continue to be used. The second information receipt includes a port number of the first optical splitter port, addresses of an optical splitter in which the first optical splitter port is located and a fiber access terminal, and damage type information.

Further, the damage type information includes interface physical damage information and interface fiber connection line damage information.

S27: The network device re-identifies the first optical splitter port, and allocates a new optical splitter port. Then J20 is performed.

If the network device receives the first information receipt and stores the first information receipt, the network device changes the original "idle" identifier of the first optical splitter port into an "in use" identifier, updates the port database in the network device, and stores the correspondence between the second optical cable identifier and the first optical splitter port information.

If the network device receives the second information receipt and stores the second information receipt, the network device changes the original "idle" identifier of the first optical splitter port into a "damaged" identifier, updates the port database in the network device, and waits for subsequent maintenance of the first optical splitter port.

The network device allocates anew optical splitter port, uses the new optical splitter port as the first optical splitter port, and sends first port information corresponding to the port to the terminal device, where the first port information includes the first port identifier, and the first port identifier is used to indicate the optical splitter port.

Optionally, the first port information may further include a sequence number of the optical splitter port, and a serial number and an address of an optical splitter in which the optical splitter port is located.

S28: The terminal device sends an optical cable installation complete indication message to the network device. Then S29 is performed.

The first optical fiber is connected to the first optical splitter port, and the terminal device receives a service provisioning complete message, wherein the service provisioning complete message indicates that the ONU service transmitted to the user through the connection between the first optical cable and the first port has been provisioned.

Optionally, the service provisioning complete message may be manually input by the first user device, or manually input by a construction engineer after an onsite test.

The terminal device sends the optical cable installation complete indication message to the network device, where the optical cable installation complete indication message carries the first port identifier, the first user device information, and the first optical cable identifier, and the first optical cable identifier is used to indicate a first optical cable corresponding to the first user device information.

Optionally, the optical cable installation complete indication message may further carry fiber access terminal information.

Optionally, the terminal device reads the fiber access terminal information stored in a fiber access terminal label on the fiber access terminal in which the first optical splitter port is located, and sends the information to the network device, where the fiber access terminal information is stored in the fiber access terminal label.

Specifically, the fiber access terminal has the fiber access terminal label, and the fiber access terminal label includes a barcode, a two-dimensional code, an RFID (Radio Frequency Identification, radio frequency identification) label, and an NFC (Near Field Communication, near field communication) label.

Optionally, the fiber access terminal information includes a model and a split ratio of an optical splitter in which the first optical splitter port is located, and a vendor and GIS coordinates of the fiber access terminal in which the first optical splitter port is located.

S29: The network device stores a correspondence between the first user device information, the first optical cable information, and the first port information, where the first user device information, the first optical cable information, and the first port information are in a one-to-one correspondence with each other.

The method for establishing an optical cable connection provided in the first embodiment resolves the problems that recorded information is incorrect, a port resource is wasted, information is not updated in time, and an optical cable connection is inaccurate because information related to an optical cable connection is manually recorded by using the existing optical fiber connection allocation technology. The method and the system apparatus for intelligently establishing an optical cable connection and a physical topology relationship is provided, so that the optical fiber connection status information can be accurately updated, the optical cable connection error rate is greatly reduced, and the optical fiber resources are saved.

Figure 3:
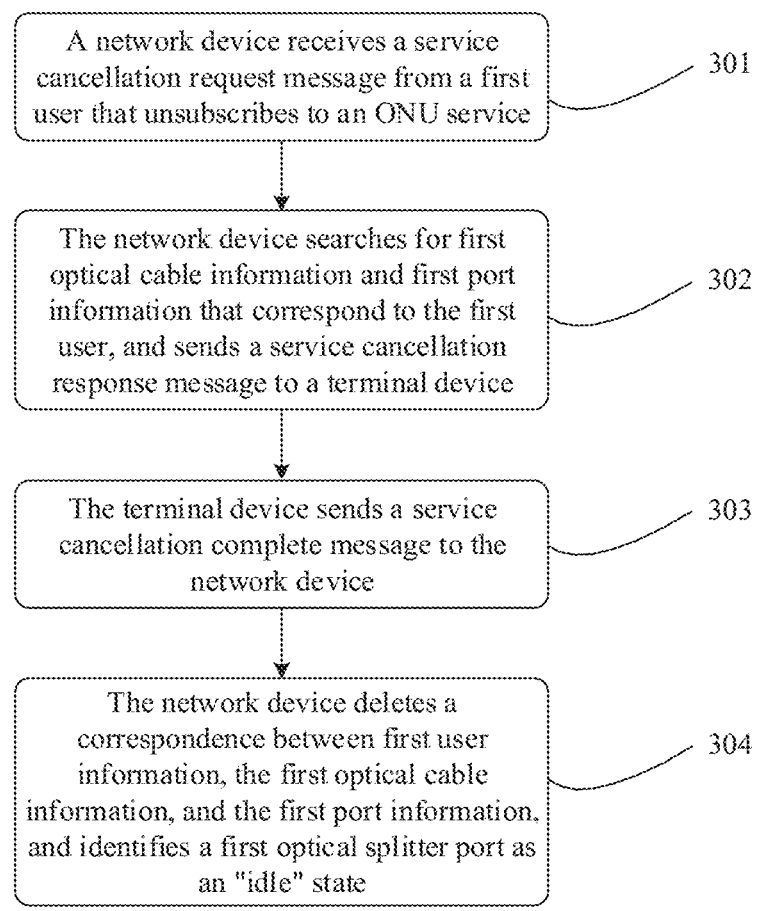
FIG. 3 is a flowchart of a method for releasing an optical cable connection according to a second embodiment.

A second embodiment provides a method for releasing an optical cable connection. The method for releasing an optical cable connection may be performed after the optical cable connection is established in the foregoing embodiment. As shown in FIG. 3, the method is performed by a network device and a terminal device, and the network device includes a resource management system and a network management system.

The method for releasing an optical cable connection provided in this embodiment includes the following steps.

Step 301: The network device receives a service cancellation request message from a first user device that unsubscribes to an ONU service.

The network device processes an application of the first user device for unsubscribing to the ONU service, and receives first user device information of the first user device.

Optionally, the first user device information may include a user name, a service type that is applied for, a network access account, a phone number, an address, and an SN number of an ONU.

Step 302: The network device searches for first optical cable information and first port information that correspond to the first user device, and sends a service cancellation response message to the terminal device.

The network device stores the first user device information, the first optical cable information, and the first port information, and stores a correspondence between the first user device information, the first optical cable information, and the first port information, where the first user device information is in a one-to-one correspondence with the first optical cable information, and the first optical cable information is in a one-to-one correspondence with the first port information.

The network device further stores a port database, and the network device identifies a use status of each optical splitter port based on an actual use status of the port, and stores an identification result in the port database. A use status identifier of an optical splitter port includes the following four types: an "in use" identifier, where an optical splitter port corresponding to the identifier is connected to a user and an optical cable, and the user is currently using an ONU service; an "idle" identifier, where an optical splitter port corresponding to the identifier is not connected to a user or an optical cable, and the port is still available; a "to be removed" identifier, where an optical splitter port corresponding to the identifier is connected to an optical cable of a user, but the user has unsubscribed to an ONU service, and the optical cable of the user waits for being removed; and a "damaged" identifier, where an optical splitter port corresponding to the identifier has been damaged and needs to be repaired subsequently.

The first port information corresponds to a first optical splitter port, and the first port information includes an identifier of the first optical splitter port, where the identifier is used to indicate the allocated first optical splitter port.

The network device finds, based on the received first user device information, the first optical cable information and the first port information that are stored in a system and that correspond to the first user device information, and sends the service cancellation response message to the terminal device of the construction engineer. The service cancellation response message includes the first optical cable information and the first port information.

Optionally, the first optical cable identifier includes a serial number of the first optical cable.

Optionally, the first port information may further include a port number of the first optical splitter port, and a serial number and an address of the optical splitter in which the first optical splitter port is located.

Step 303: The terminal device sends a service cancellation complete message to the network device.

After receiving the service cancellation response message sent by the network device, the terminal device finds, based on the serial number and the address of the optical splitter in the first port information, the optical splitter in which the first optical splitter port is located, and then finds, by reading a first label on an onsite optical cable, the first optical cable corresponding to the first optical cable information.

The first label is on the onsite optical cable. The first label includes a barcode, a two-dimensional code, an RFID (Radio Frequency Identification, radio frequency identification) label, and an NFC (Near Field Communication, near field communication) label. Onsite optical cable information is stored in the first label, the onsite optical cable information includes an optical cable serial number, and the onsite optical cable is in a one-to-one correspondence with the onsite optical cable information. The terminal device may obtain, by reading the first label on the onsite optical cable, the onsite optical cable information stored in the first label, and determine whether the onsite optical cable information is consistent with the first optical cable information sent by the network device. If the onsite optical cable information is consistent with the first optical cable information, the onsite optical cable is the first optical cable.

The construction engineer sends the service cancellation complete message to the network device by using the terminal device, where the service cancellation complete message is used to indicate that the connection between the first optical cable and the first optical splitter port is disconnected. It should be noted that the disconnection herein indicates that the ONU service between the optical cable and the optical splitter port is interrupted, and does not indicate a physical disconnection.

Step 304: The network device deletes the correspondence between the first user device information, the first optical cable information, and the first port information, and identifies the first optical splitter port as an "idle" state.

After receiving the service cancellation complete message sent by the terminal device, the network device deletes the correspondence, originally stored in the system, between the first user device information, the first optical cable message, and the first port information. In addition, in the port database, the first optical splitter port is identified as an "idle" identifier.

The second embodiment provides the method for releasing an optical cable connection. Based on the correspondence between the first user device information, the first optical cable information, and the first port information provided in the first embodiment, when a service of a user changes, optical cable information and port information that correspond to user information can be accurately found based on the user information, so that an optical cable of the user and an optical splitter port connected to the user can be accurately found based on the optical cable information and the port information of the user, thereby facilitating fault maintenance and a service of another user. When the user unsubscribes to an ONU service, the optical cable can be recycled, an idle port is spared, and optical cable resources and port resources are saved.

Figure 4A:
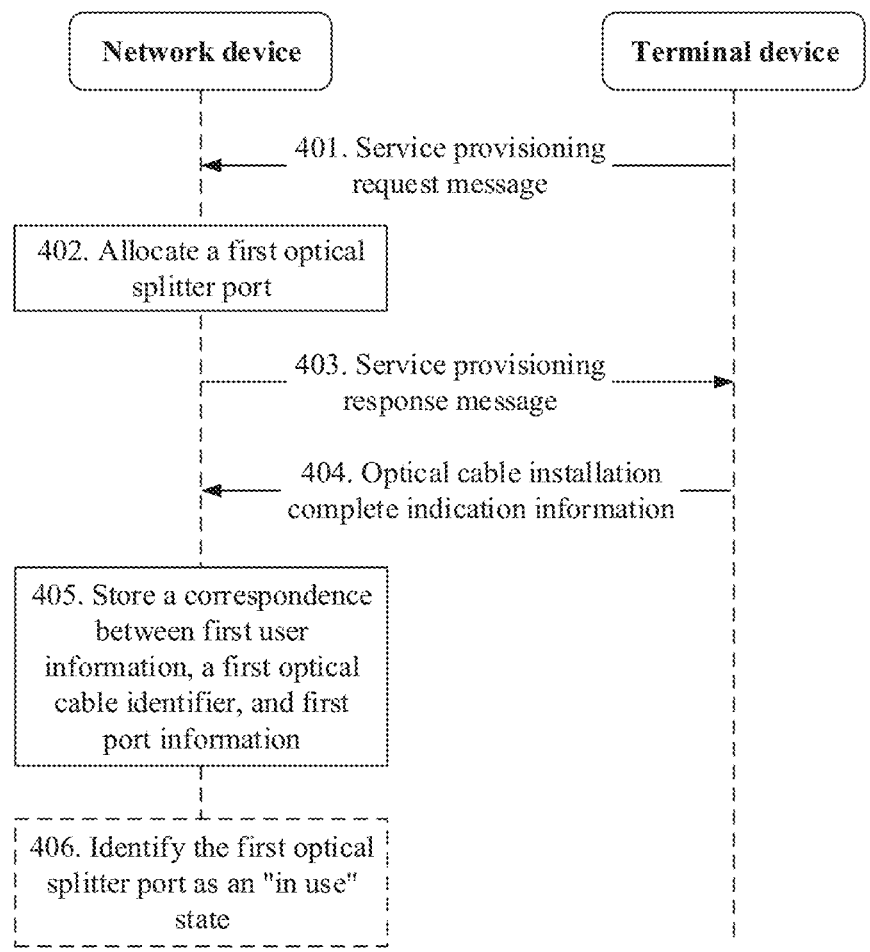
FIG. 4a is a flowchart of a method for establishing an optical cable connection by a network device according to a third embodiment.

A third embodiment provides a method for establishing an optical cable connection. FIG. 4a shows the method for establishing an optical cable connection. The method is performed by a network device and a terminal device. The network device includes a resource management system or a network management system. The terminal device may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device includes a mobile phone, a tablet computer, a portable notebook computer, a virtual/hybrid/augmented reality device, a navigation device, a session initiation protocol (Session Initiation Protocol, SIP) phone, a wireless local loop (Wireless Local Loop, WLL) station, a personal digital assistant (Personal Digital Assistant, PDA), a handheld device with a wireless communication function, a computing device, or another processing device connected to a wireless modem, a vehicle-mounted device, a wearable device; a terminal device in a 5G network, a terminal device in a future evolved public land mobile communications network (Public Land Mobile Network, PLMN) or another future communications system, or the like. This is not limited in this application.

The method for establishing an optical cable connection provided in this embodiment includes the following steps.

Step 401: The network device receives a service provisioning request message that includes first user device information and that is sent by the terminal device, where the first user device information includes an address of a first user device for which a service needs to be provisioned.

Optionally, the first user device information may further include a user name, a service type that is applied for, a network access account, a phone number, GIS coordinates, and an SN number of an ONU.

Step 402: The network device allocates a first optical splitter port based on the first user device information, where the first optical splitter port is installed on an optical splitter.

Step 403: The network device sends a first service provisioning response message to the terminal device, where the first service provisioning response message includes the first user device information and first port information, and the first port information includes a first port identifier used to indicate the allocated first optical splitter port.

Optionally, the first port information further includes a serial number of the optical splitter in which the first optical splitter port is located and an address of the optical splitter in which the first optical splitter port is located. The address of the optical splitter may be used by a construction engineer to find the first optical splitter port.

Step 404: The network device receives an optical cable installation complete indication message sent by the terminal device, where the optical cable installation complete indication message carries the first port identifier, the first user device information, and a first optical cable identifier, and the first optical cable identifier is used to indicate a first optical cable corresponding to the first user device information.

Optionally, the optical cable installation complete indication message may further carry the first port information. The optical cable installation complete indication message may further carry fiber access terminal information sent by the terminal device, and the fiber access terminal information may include a model and a split ratio of the optical splitter in which the first optical splitter port is located, and a vendor and GIS coordinates of the fiber access terminal in which the first optical splitter port is located.

Step 405: The network device stores a correspondence between the first optical cable identifier, the first port identifier, and the first user device information.

The correspondence stored in the network device may be a correspondence between the first optical cable identifier, the first port information, and the first user device information.

The method may further include the following step:

Step 406: The network device identifies the first optical splitter port as an "in use" state.

The network device identifies a use status of each optical splitter port based on an actual use status of the port. A use status identifier of an optical splitter port includes the following four types: an "in use" identifier, where an optical splitter port corresponding to the identifier is connected to a user and an optical cable, and the user is currently using an ONU service; an "idle" identifier, where an optical splitter port corresponding to the identifier is not connected to a user or an optical cable, and the port is still available; a "to be removed" identifier, where an optical splitter port corresponding to the identifier is connected to an optical cable of a user, but the user has unsubscribed to an ONU service, and the optical cable of the user waits for being removed; and a "damaged" identifier, where an optical splitter port corresponding to the identifier has been damaged and needs to be repaired subsequently.

Figure 4B:
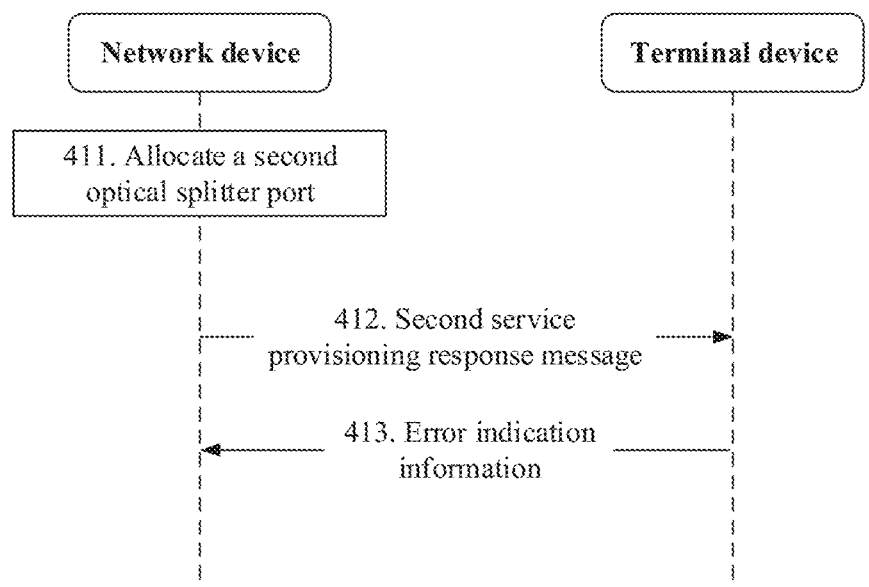
FIG. 4b is a flowchart of a method for processing a second optical splitter port by a network device according to a third embodiment.

Between step 401 and step 402, as shown in FIG. 4*b*, the method may further include the following steps:

Step 411: The network device allocates a second optical splitter port based on the first user device information, where the second optical splitter port is installed on the optical splitter.

Step 412: The network device sends a second service provisioning response message to the terminal device, where the second service provisioning response message includes the first user device information and second port information, and the second port information includes a second port identifier used to indicate the allocated second optical splitter port.

The second port information further includes a serial number of the optical splitter in which the second optical splitter port is located and an address of the optical splitter in which the second optical splitter port is located. The address of the optical splitter may be used by a construction engineer to find the second optical splitter port.

Step 413: The network device receives an error indication message, where the error indication message indicates that the second optical splitter port is occupied by a second user, and the second user is in an active state.

Specifically, the second optical splitter port is connected to a second optical cable, and the second optical cable is an optical cable connected to the second optical splitter port before this embodiment is performed.

Specifically, the network device receives the error indication message sent by the terminal device. The error indication message carries the second optical cable identifier, and the second optical cable identifier is used to indicate the second optical cable.

Further, the network device queries whether a second user corresponding to the second optical cable identifier is in an active state, that is, whether the second user is using an ONU service. If the second user is using the ONU service, the network device needs to reallocate an optical splitter port. If the second user is not using the ONU service, the network device sends, to the terminal device, a second optical cable removal instruction message, where the second optical cable removal instruction message is used to notify that the second optical fiber can be removed.

Figure 4C:
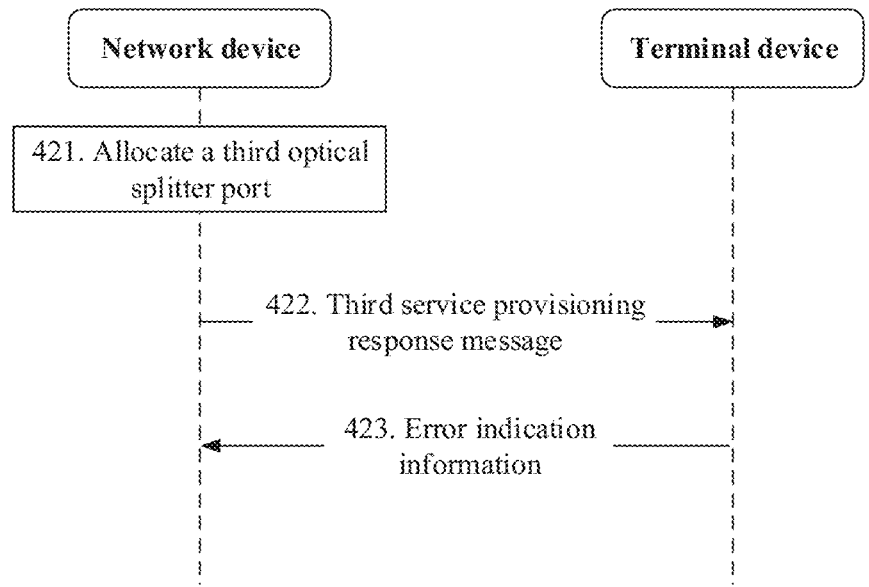
FIG. 4c is a flowchart of a method for processing a third optical splitter port by a network device according to a third embodiment.

Optionally, between step 401 and step 402, as shown in FIG. 4*c*, the method may further include the following steps:

Step 421: The network device allocates a third optical splitter port based on the first user device information, where the third optical splitter port is installed on the optical splitter.

Step 422: The network device sends a third service provisioning response message to the terminal device, where the third service provisioning response message includes the first user device information and third port information, and the third port information includes a third port identifier used to indicate the allocated second optical splitter port.

The third port information further includes a serial number of the optical splitter in which the third optical splitter port is located and an address of the optical splitter in which the third optical splitter port is located. The address of the optical splitter may be used by a construction engineer to find the third optical splitter port.

Step 423: The network device receives an error indication message, where the error indication message indicates that the third optical splitter port is in a fault state.

Further, the network device needs to reallocate an optical splitter port, and identify the third optical splitter port as a "to-be-repaired" identifier.

Optionally, the error indication message includes fault type information of the third optical splitter port. The fault type information may include physical damage indication information and line damage indication information.

Figure 4D:
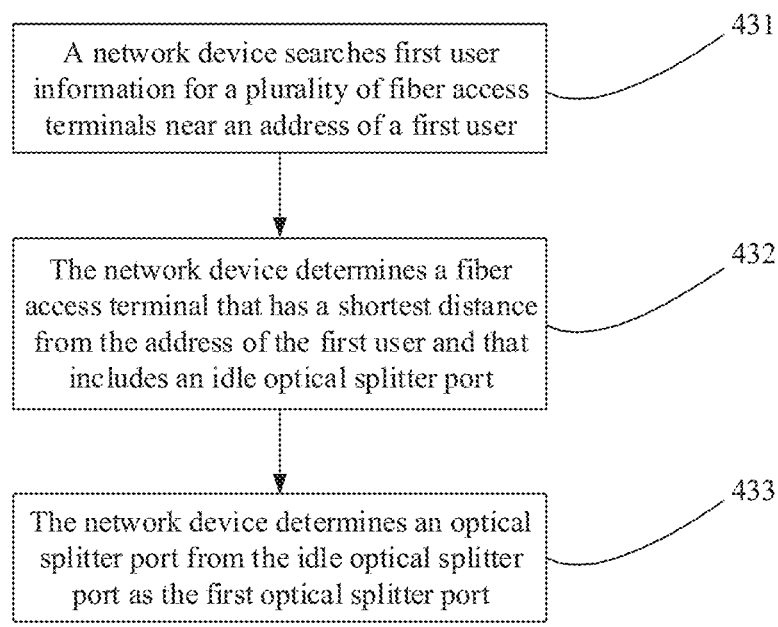
FIG. 4d is a flowchart of a method for allocating an optical splitter port by a network device according to a third embodiment.

Specifically, as shown in FIG. 4*d*, that the network device allocates a first optical splitter port based on the first user device information includes:

Step 431: The network device searches the first user device information for a plurality of fiber access terminals near the address of the first user device.

Step 432: The network device determines a fiber access terminal that has a shortest distance from the address of the first user device and that includes an idle optical splitter port, where the idle optical splitter port is an optical splitter port that has not been allocated to another user.

Step 433: The network device determines an optical splitter port from the idle optical splitter port as the first optical splitter port.

Figure 5:
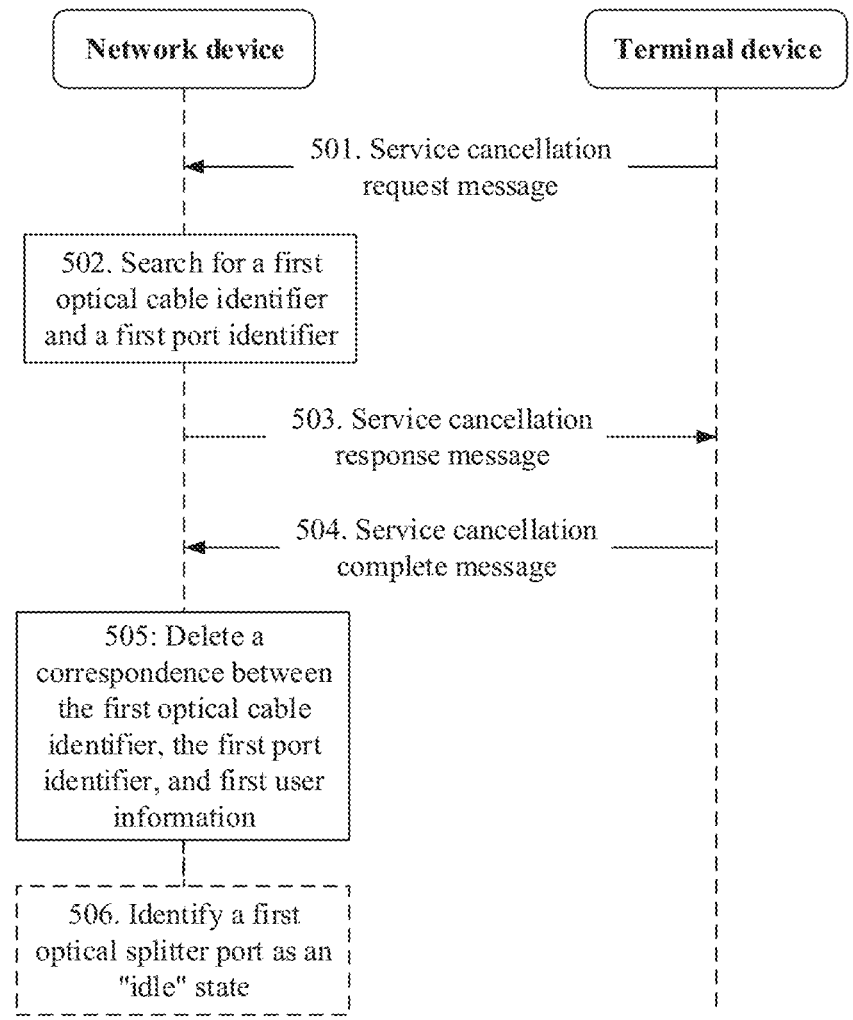
FIG. 5 is a flowchart of a method for releasing an optical cable connection by a network device according to a fourth embodiment.

A fourth embodiment provides a method for releasing an optical cable connection. The action of releasing an optical cable may be initiated when a request of a user for canceling an ONU service is received and after the optical cable connection is established in the foregoing embodiment. As shown in FIG. 5, the method for releasing an optical cable connection provided in this embodiment includes the following steps.

Step 501: A network device receives a service cancellation request message of a first user device, where the service cancellation request message includes first user device information.

Optionally, the first user device information may further include a user name, a service type that is applied for, a network access account, a phone number, GIS coordinates, and an SN number of an ONU.

Step 502: The network device finds, based on a correspondence between a first optical cable identifier, a first port identifier, and the first user device information, the first optical cable identifier and the first port identifier that correspond to the first user device.

Specifically, the first port identifier is used to indicate a first optical splitter port corresponding to the first user device, and the first optical cable identifier is used to indicate a first optical cable connected to the first optical splitter port.

Step 503: The network device sends a service cancellation response message to a terminal device, where the service cancellation response message is used to instruct to cancel an ONU service of the first user device, and the service cancellation response message includes the first optical cable identifier and the first port identifier.

Optionally, the service cancellation response message may further include first port information, the first port information may carry a serial number and an address of the optical splitter in which the first optical splitter port is located. The address of the optical splitter may be used by a construction engineer to find the first optical splitter port.

Step 504: The network device receives a service cancellation complete message sent by the terminal device, where the service cancellation complete message indicates that a connection between the first optical cable and the first optical splitter port is disconnected.

After removing the optical cable and confirming there is no error, the construction engineer sends the service cancellation complete message by using the terminal device. The service cancellation complete message is used to indicate that the connection between the first optical cable and the first optical splitter port is disconnected. It should be noted that the disconnection herein indicates that the ONU service between the optical cable and the optical splitter port is interrupted, and does not indicate a physical disconnection.

Step 505: The network device deletes the correspondence between the first optical cable identifier, the first port identifier, and the first user device information.

Optionally, the method further includes the following step:

Step 506: The network device identifies the first optical splitter port as an "idle" state, where the "idle" state indicates that no optical cable is connected to the optical splitter port and the optical splitter port is available.

Figure 6A:
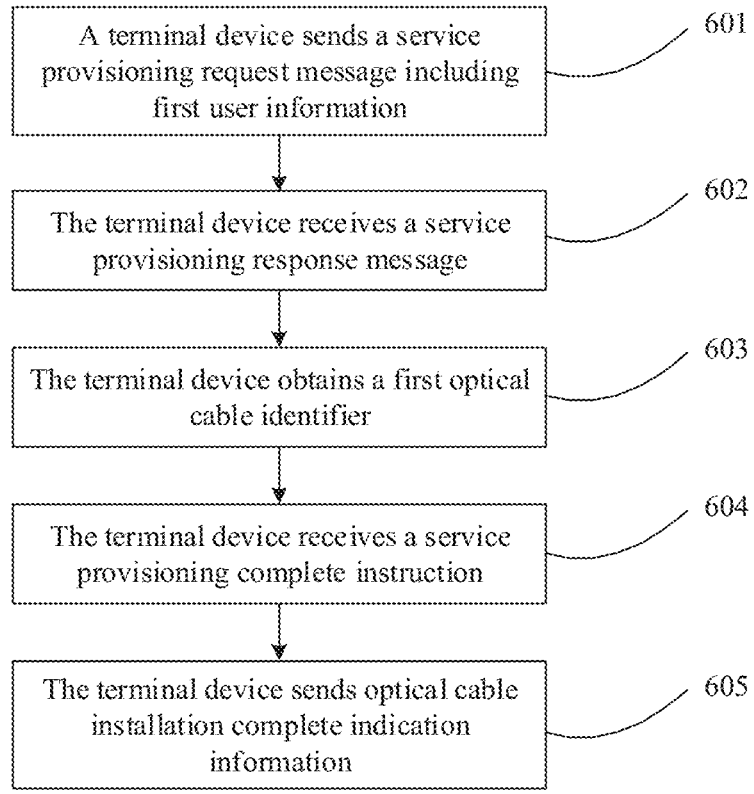
FIG. 6a is a flowchart of a method for establishing an optical cable connection according to a fifth embodiment.

A fifth embodiment provides a method for establishing an optical cable connection. As shown in FIG. 6a, the method for establishing an optical cable connection provided in this embodiment includes the following steps.

Step 601: A terminal device sends a service provisioning request message including first user device information, where the first user device information includes an address of a first user device for which a service needs to be provisioned.

The first user device information may further include a user name, a service type that is applied for, a network access account, a phone number, GIS coordinates, and an SN number of an ONU.

Step 602: The terminal device receives a first service provisioning response message sent by a network device, where the first service provisioning response message includes the first user device information and first port information, and the first port information includes a first port identifier used to indicate a first optical splitter port.

The first port information further includes a serial number of an optical splitter in which the first optical splitter port is located and an address of the optical splitter in which the first optical splitter port is located. The address of the optical splitter may be used by a construction engineer to find the first optical splitter port.

Step 603: The terminal device obtains a first optical cable identifier, where the first optical cable identifier corresponds to a first optical cable corresponding to the first user device information.

Step 604: The terminal device receives a service provisioning complete message, wherein the service provisioning complete message indicates that an ONU service transmitted to the user through a connection between the first optical cable and the first port has been provisioned.

The first optical fiber is connected to the first optical splitter port, and the terminal device receives a service provisioning complete message, wherein the service provisioning complete message indicates that the ONU service transmitted to the user through the connection between the first optical cable and the first port has been provisioned.

The service provisioning complete message may be manually input by the first user device, or manually input by a construction engineer after an onsite test.

Step 605: The terminal device sends an optical cable installation complete indication message to the network device, where the optical cable installation complete indication message carries the first port identifier, the first user device information, and the first optical cable identifier.

The terminal device sends the optical cable installation complete indication message to the network device, where the optical cable installation complete indication message carries the first port identifier, the first user device information, and the first optical cable identifier, and the first optical cable identifier is used to indicate a first optical cable corresponding to the first user device information.

The optical cable installation complete indication message may further carry fiber access terminal information.

Optionally, the terminal device reads the fiber access terminal information stored in a fiber access terminal label on the fiber access terminal in which the first optical splitter port is located, and sends the information to the network device, where the fiber access terminal information is stored in the fiber access terminal label.

Specifically, the fiber access terminal has the fiber access terminal label, and the fiber access terminal label includes a barcode, a two-dimensional code, an RFID (Radio Frequency Identification, radio frequency identification) label, and an NFC (Near Field Communication, near field communication) label.

Optionally, the fiber access terminal information includes a model and a split ratio of an optical splitter in which the first optical splitter port is located, and a vendor and GIS coordinates of the fiber access terminal in which the first optical splitter port is located.

Specifically, that the terminal device obtains a first optical cable identifier specifically includes:

The terminal device reads a first label on the first optical cable to obtain the first optical cable identifier, where the first optical cable identifier is stored in the first label. The first optical cable information includes the first optical cable identifier, and the first optical cable identifier is used to indicate the first optical cable corresponding to the first user device.

Optionally, the first optical cable identifier includes a serial number of the first optical cable.

Optionally, the first label includes a barcode, a two-dimensional code, an RFID (Radio Frequency Identification, radio frequency identification) label, and an NFC (Near Field Communication, near field communication) label.

Figure 6B:
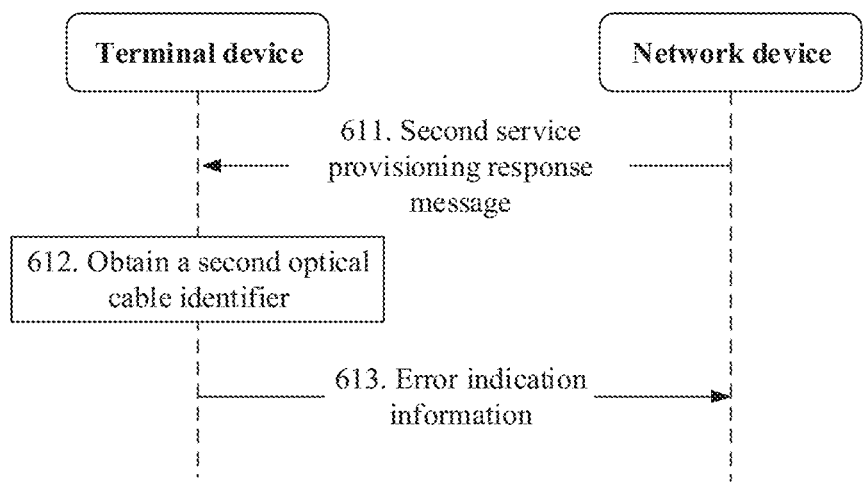
FIG. 6b is a flowchart of a method for processing a second optical splitter port by a terminal device according to a fifth embodiment.

Between step 601 and step 602, as shown in FIG. 6b, the method may further include the following steps:

Step 611: The terminal device receives a second service provisioning response message sent by a network device, where the second service provisioning response message includes the first user device information and second port information, and the second port information includes a second port identifier used to indicate a second optical splitter port.

Optionally, the second port information further includes a serial number of an optical splitter in which the second optical splitter port is located and an address of the optical splitter in which the second optical splitter port is located. The address of the optical splitter may be used by a construction engineer to find the second optical splitter port.

Step 612: The terminal device reads a second label on a second optical cable to obtain a second optical cable identifier, where the second optical cable identifier is used to indicate the second optical cable connected to the second optical splitter port.

Optionally, the second optical cable identifier includes a second optical cable serial number.

Optionally, the second label includes a barcode, a two-dimensional code, an RFID (Radio Frequency Identification, radio frequency identification) label, and an NFC (Near Field Communication, near field communication) label.

Step 613: The terminal device sends an error indication message to the network device, where the error indication message carries the second optical cable identifier, and the error indication message is used to indicate that the second optical splitter port is occupied by the second optical cable.

Figure 6C:
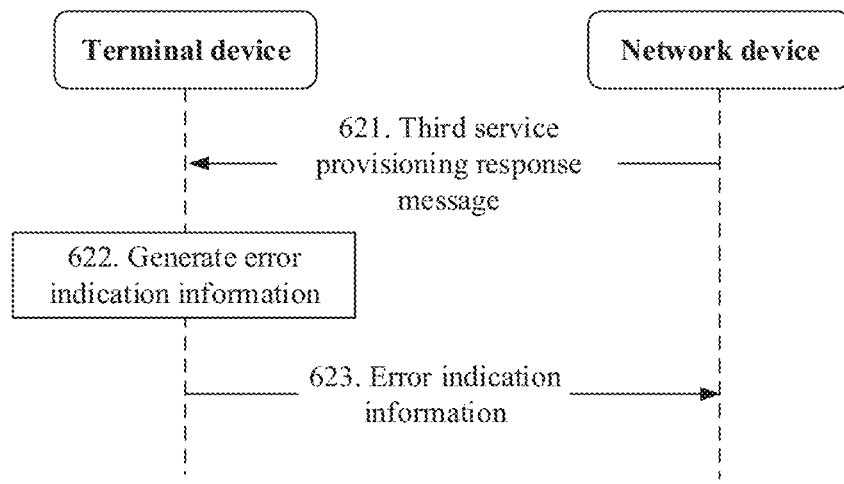
FIG. 6c is a flowchart of a method for processing a third optical splitter port by a terminal device according to a fifth embodiment.

Optionally, between step 601 and step 602, as shown in FIG. 6c, the method further includes the following steps:

Step 621: The terminal device receives a third service provisioning response message sent by a network device, where the third service provisioning response message includes the first user device information and third port information, and the third port information includes a third port identifier used to indicate a third optical splitter port.

Optionally, the third port information further includes a serial number of an optical splitter in which the third optical splitter port is located and an address of the optical splitter in which the third optical splitter port is located. The address of the optical splitter may be used by a construction engineer to find the third optical splitter port.

Step 622: The terminal device generates an error indication message of the third optical splitter port.

The terminal device receives a fault type information of the third optical splitter port and generates the error indication message.

The fault type information may include physical damage indication information and line damage indication information.

Step 623: The terminal device sends the error indication message to the network device, where the error indication message indicates that the third optical splitter port is in a fault state.

Figure 6D:
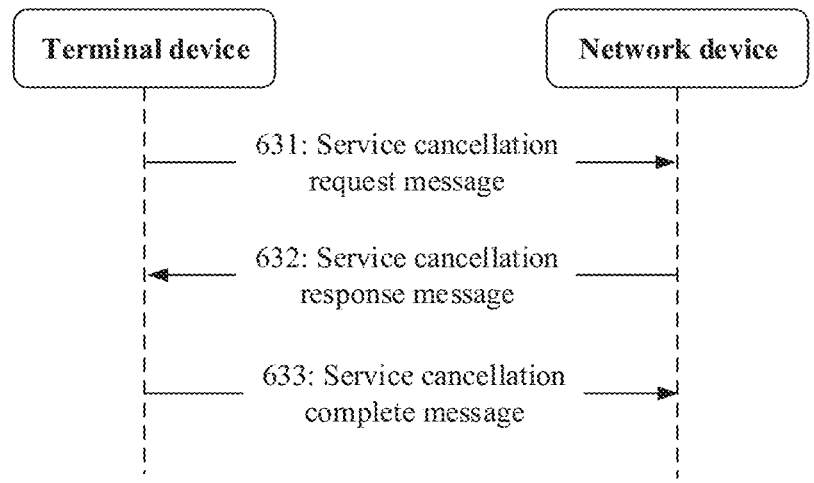
FIG. 6d is a flowchart of a method for releasing an optical cable connection according to a fifth embodiment.

Optionally, as shown in FIG. 6d, the method further includes the following steps:

Step 631: The terminal device sends a service cancellation request message of the first user device to the network device, where the service cancellation request message includes the first user device information.

Step 632: The terminal device receives a service cancellation response message sent by the network device, where the service cancellation response message is used to instruct to cancel an ONU service of the first user device, and the service cancellation response message includes the first optical cable identifier and the first port identifier.

Optionally, the service cancellation response message may further include first port information, the first port information may carry a serial number and an address of the optical splitter in which the first optical splitter port is located. The address of the optical splitter may be used by a construction engineer to find the first optical splitter port.

Step 633: The terminal device sends a service cancellation complete message to the network device, where the service cancellation complete message is used to indicate that a connection between the first optical cable and the first optical splitter port is disconnected.

After removing the optical cable and confirming there is no error, the construction engineer sends the service cancellation complete message by using the terminal device. The service cancellation complete message is used to indicate that the connection between the first optical cable and the first optical splitter port is disconnected. It should be noted that the disconnection herein indicates that the ONU service between the optical cable and the optical splitter port is interrupted, and does not indicate a physical disconnection.

Figure 7:
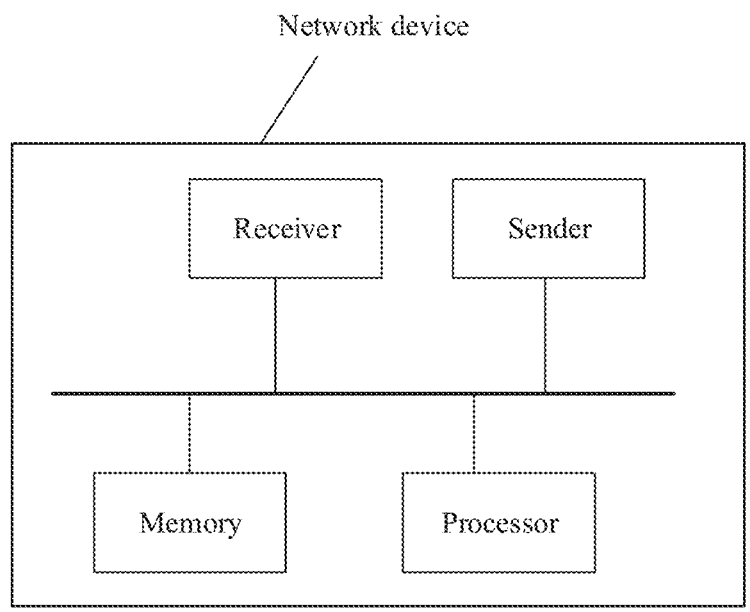
FIG. 7 is an apparatus diagram of a network device according to a sixth embodiment.

A sixth embodiment provides a network device related to the foregoing method embodiments. The network device includes a resource management system or a network management system. As shown in FIG. 7, the network device provided in this embodiment includes a receiver, a sender, a processor, and a memory.

The receiver is configured to receive a service provisioning request message including first user device information, where the first user device information includes an address of a first user device for which a service needs to be provisioned.

The processor is configured to allocate a first optical splitter port based on the first user device information, where the first optical splitter port is installed on an optical splitter.

The sender is configured to send a first service provisioning response message to a terminal device, where the first service provisioning response message includes the first user device information and first port information, and the first port information includes a first port identifier used to indicate the allocated first optical splitter port.

The receiver is further configured to receive an optical cable installation complete indication message sent by the terminal device, where the optical cable installation complete indication message carries the first port identifier, the first user device information, and a first optical cable identifier, and the first optical cable identifier is used to indicate a first optical cable corresponding to the first user device information.

The memory is configured to store a correspondence between the first optical cable identifier, the first port identifier, and the first user device information.

The first port information further includes a serial number of the optical splitter in which the first optical splitter port is located and an address of the optical splitter in which the first optical splitter port is located. The address of the optical splitter may be used by a construction engineer to find the first optical splitter port.

The first user device information may further include a user name, a service type that is applied for, a network access account, a phone number, GIS coordinates, and an SN number of an ONU.

The optical cable installation complete indication message may further carry the first port information.

The optical cable installation complete indication message may further carry fiber access terminal information sent by the terminal device.

Optionally, the fiber access terminal information includes a model and a split ratio of an optical splitter in which the first optical splitter port is located, and a vendor and GIS coordinates of the fiber access terminal in which the first optical splitter port is located.

Optionally, the processor is further configured to identify an optical splitter port, and the processor identifies a use status of each optical splitter port based on an actual use status of the port.

A use status identifier of an optical splitter port includes the following four types: an "in use" identifier, where an optical splitter port corresponding to the identifier is connected to a user and an optical cable, and the user is currently using an ONU service; an "idle" identifier, where an optical splitter port corresponding to the identifier is not connected to a user or an optical cable, and the port is still available; a "to be removed" identifier, where an optical splitter port corresponding to the identifier is connected to an optical cable of a user, but the user has unsubscribed to an ONU service, and the optical cable of the user waits for being removed; and a "damaged" identifier, where an optical splitter port corresponding to the identifier has been damaged and needs to be repaired subsequently.

Specifically, that the processor is configured to allocate a first optical splitter port based on the first user device information specifically includes:

searching, by the processor, the first user device information for a plurality of fiber access terminals near the address of the first user device;

determining, by the processor, a fiber access terminal that has a shortest distance from the address of the first user device and that includes an idle optical splitter port, where the idle optical splitter port is an optical splitter port that has not been allocated to another user; and determining, by the processor, an optical splitter port from the idle optical splitter port as the first optical splitter port.

Optionally, the network device further includes:

the processor, further configured to allocate a second optical splitter port based on the first user device information, where the second optical splitter port is installed on the optical splitter;

the sender, further configured to send a second service provisioning response message to the terminal device, where the second service provisioning response message includes the first user device information and second port information, and the second port information includes a second port identifier used to indicate the allocated second optical splitter port; and the receiver, further configured to receive an error indication message, where the error indication message indicates that the second optical splitter port is occupied by a second user, and the second user is in an active state.

Optionally, the network device further includes:

the processor, further configured to allocate a third optical splitter port based on the first user device information, where the third optical splitter port is installed on the optical splitter;

the sender, further configured to send a third service provisioning response message to the terminal device, where the third service provisioning response message includes the first user device information and third port information, and the third port information includes a third port identifier used to indicate the allocated second optical splitter port; and the receiver, further configured to receive an error indication message, where the error indication message indicates that the third optical splitter port is in a fault state.

Optionally, the network device further includes:

the receiver, further configured to receive a service cancellation request message, sent by the terminal device, of the first user device, where the service cancellation request message includes the first user device information;

the processor, further configured to find, based on the correspondence between the first optical cable identifier, the first port identifier, and the first user device information, the first optical cable identifier and the first port identifier that correspond to the first user device;

the sender, further configured to send a service cancellation response message to the terminal device, where the service cancellation response message is used to instruct to cancel an ONU service of the first user device, and the service cancellation response message includes the first optical cable identifier or the first port information;

the receiver, further configured to receive a service cancellation complete message sent by the terminal device, where the service cancellation complete message is used to indicate that a connection between the first optical cable and the first optical splitter port is disconnected; and the processor, further configured to delete the correspondence between the first optical cable identifier, the first port information, and the first user device information.

Figure 8:
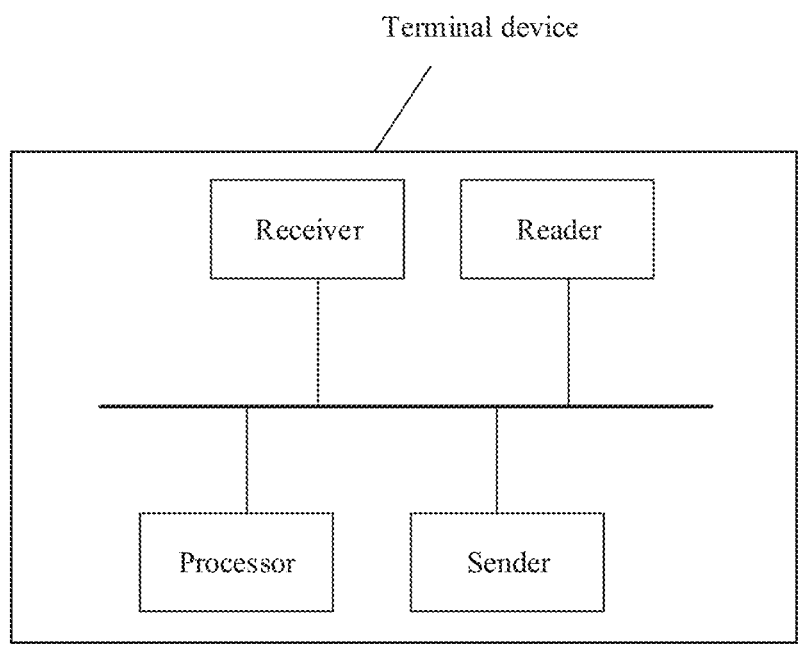
FIG. 8 is an apparatus diagram of a terminal device according to a seventh embodiment.

A seventh embodiment provides a terminal device. The terminal device may be configured to perform related steps in the foregoing method embodiment. As shown in FIG. 8, the terminal device provided in this embodiment includes: a receiver, a sender, and a reader.

The sender is configured to send a service provisioning request message including first user device information, where the first user device information includes an address of a first user device for which a service needs to be provisioned.

The receiver is configured to receive a first service provisioning response message sent by a network device, where the first service provisioning response message includes the first user device information and first port information, and the first port information includes a first port identifier used to indicate a first optical splitter port.

The reader is configured to obtain a first optical cable identifier, where the first optical cable identifier corresponds to a first optical cable corresponding to the first user device information.

The receiver is further configured to receive a service provisioning complete message, wherein the service provisioning complete message indicates that an ONU service transmitted to the user through a connection between the first optical cable and the first port has been provisioned.

The sender is further configured to send an optical cable installation complete indication message to the network device, where the optical cable installation complete indication message carries the first port identifier, the first user device information, and the first optical cable identifier.

The first user device information may further include a user name, a service type that is applied for, a network access account, a phone number, GIS coordinates, and an SN number of an ONU.

The first port information further includes a serial number of an optical splitter in which the first optical splitter port is located and an address of the optical splitter in which the first optical splitter port is located. The address of the optical splitter may be used by a construction engineer to find the first optical splitter port.

The optical cable installation complete indication message may further carry fiber access terminal information.

Optionally, the reader reads the fiber access terminal information stored in a fiber access terminal label on the fiber access terminal in which the first optical splitter port is located, and sends the information to the network device, where the fiber access terminal information is stored in the fiber access terminal label.

Specifically, the fiber access terminal has the fiber access terminal label, and the fiber access terminal label includes a barcode, a two-dimensional code, an RFID (Radio Frequency Identification, radio frequency identification) label, and an NFC (Near Field Communication, near field communication) label.

Optionally, the fiber access terminal information includes a model and a split ratio of an optical splitter in which the first optical splitter port is located, and a vendor and GIS coordinates of the fiber access terminal in which the first optical splitter port is located.

Specifically, that the reader is configured to obtain a first optical cable identifier specifically includes:

reading, by the reader, a first label on the first optical cable to obtain the first optical cable identifier, where the first optical cable identifier is stored in the first label.

The reader may be a camera of the terminal device, an RFID reader, or an NFC reader. The reader may read a barcode, a two-dimensional code, an RFID (Radio Frequency Identification, radio frequency identification) label, and an NFC (Near Field Communication, near field communication) label.

Optionally, the terminal device further includes:

the receiver, further configured to receive a second service provisioning response message sent by the network device, where the second service provisioning response message includes the first user device information and second port information, and the second port information includes a second port identifier used to indicate a second optical splitter port;

the reader, further configured to read a second label on a second optical cable to obtain a second optical cable identifier, where the second optical cable identifier is used to indicate the second optical cable connected to the second optical splitter port; and the sender, further configured to send an error indication message to the network device, where the error indication message carries the second optical cable identifier, and the error indication message is used to indicate that the second optical splitter port is occupied by the second optical cable.

Optionally, the terminal device further includes a processor.

The receiver is further configured to receive a third service provisioning response message sent by the network device, where the third service provisioning response message includes the first user device information and third port information, and the third port information includes a third port identifier used to indicate a third optical splitter port.

The processor is configured to generate an error indication message of the third optical splitter port.

The sender is further configured to send the error indication message to the network device, where the error indication message indicates that the third optical splitter port is in a fault state.

The error indication message may carry fault type information.

The fault type information may include physical damage indication information and line damage indication information.

The sender may be further configured to send a service cancellation request message of the first user device to the network device, where the service cancellation request message includes the first user device information.

The receiver may be further configured to receive a service cancellation response message sent by the network device, where the service cancellation response message is used to instruct to cancel an ONU service of the first user device, and the service cancellation response message includes the first optical cable identifier or the first port information.

The sender may be further configured to send a service cancellation complete message to the network device, where the service cancellation complete message is used to indicate that a connection between the first optical cable and the first optical splitter port is disconnected.

The service cancellation complete message is used to indicate that the connection between the first optical cable and the first optical splitter port is disconnected. It should be noted that the disconnection herein indicates that the ONU service between the optical cable and the optical splitter port is interrupted, and does not indicate a physical disconnection.

Figure 9:
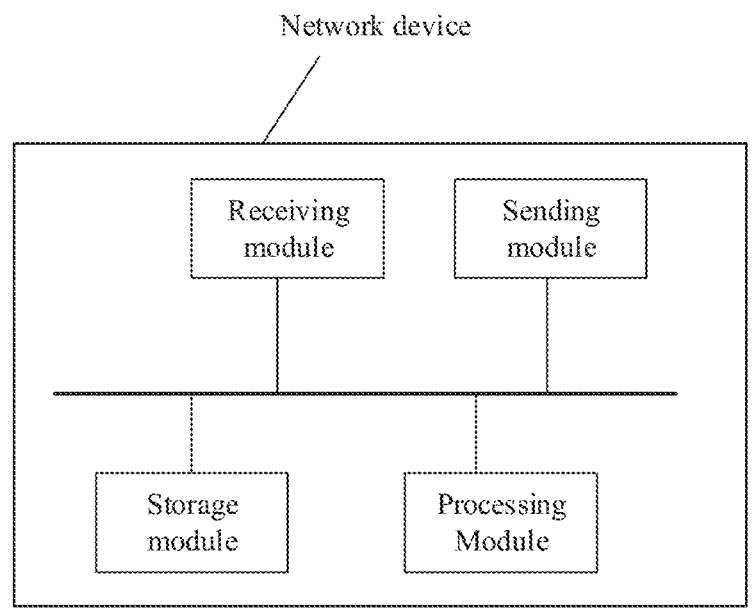
FIG. 9 is an apparatus diagram of a network device according to an eighth embodiment.

An eighth embodiment provides a network device. The network device includes a resource management system or a network management system. The network device may be configured to perform related steps in the foregoing method embodiment. As shown in FIG. 9, the network device provided in this embodiment includes a receiving module, a sending module, a processing module, and a storage module.

The receiving module is configured to receive a service provisioning request message including first user device information, where the first user device information includes an address of a first user device for which a service needs to be provisioned.

The processing module is configured to allocate a first optical splitter port based on the first user device information, where the first optical splitter port is installed on an optical splitter.

The sending module is configured to send a first service provisioning response message to a terminal device, where the first service provisioning response message includes the first user device information and first port information, and the first port information includes a first port identifier used to indicate the allocated first optical splitter port.

The receiving module is further configured to receive an optical cable installation complete indication message sent by the terminal device, where the optical cable installation complete indication message carries the first port identifier, the first user device information, and a first optical cable identifier, and the first optical cable identifier is used to indicate a first optical cable corresponding to the first user device information.

The storage module is configured to store a correspondence between the first optical cable identifier, the first port identifier, and the first user device information.

The first port information further includes a serial number of the optical splitter in which the first optical splitter port is located and an address of the optical splitter in which the first optical splitter port is located. The address of the optical splitter may be used by a construction engineer to find the first optical splitter port.

The first user device information may further include a user name, a service type that is applied for, a network access account, a phone number, GIS coordinates, and an SN number of an ONU.

The optical cable installation complete indication message may further carry the first port information.

The optical cable installation complete indication message may further carry fiber access terminal information sent by the terminal device.

Optionally, the fiber access terminal information includes a model and a split ratio of an optical splitter in which the first optical splitter port is located, and a vendor and GIS coordinates of the fiber access terminal in which the first optical splitter port is located.

Optionally, the processing module is further configured to identify an optical splitter port, and the processing module identifies a use status of each optical splitter port based on an actual use status of the port.

A use status identifier of an optical splitter port includes the following four types: an "in use" identifier, where an optical splitter port corresponding to the identifier is connected to a user and an optical cable, and the user is currently using an ONU service; an "idle" identifier, where an optical splitter port corresponding to the identifier is not connected to a user or an optical cable, and the port is still available; a "to be removed" identifier, where an optical splitter port corresponding to the identifier is connected to an optical cable of a user, but the user has unsubscribed to an ONU service, and the optical cable of the user waits for being removed; and a "damaged" identifier, where an optical splitter port corresponding to the identifier has been damaged and needs to be repaired subsequently.

Specifically, that the processing module is configured to allocate a first optical splitter port based on the first user device information specifically includes:

searching, by the processing module, the first user device information for a plurality of fiber access terminals near the address of the first user device;

determining, by the processing module, a fiber access terminal that has a shortest distance from the address of the first user device and that includes an idle optical splitter port, where the idle optical splitter port is an optical splitter port that has not been allocated to another user; and determining, by the processing module, an optical splitter port from the idle optical splitter port as the first optical splitter port.

Optionally, the network device further includes:

the processing module, further configured to allocate a second optical splitter port based on the first user device information, where the second optical splitter port is installed on the optical splitter;

the sending module, further configured to send a second service provisioning response message to the terminal device, where the second service provisioning response message includes the first user device information and second port information, and the second port information includes a second port identifier used to indicate the allocated second optical splitter port; and the receiving module, further configured to receive an error indication message, where the error indication message indicates that the second optical splitter port is occupied by a second user, and the second user is in an active state.

Optionally, the network device further includes:

the processing module, further configured to allocate a third optical splitter port based on the first user device information, where the third optical splitter port is installed on the optical splitter;

the sending module, further configured to send a third service provisioning response message to the terminal device, where the third service provisioning response message includes the first user device information and third port information, and the third port information includes a third port identifier used to indicate the allocated second optical splitter port; and the receiving module, further configured to receive an error indication message, where the error indication message indicates that the third optical splitter port is in a fault state.

Optionally, the network device further includes:

the receiving module, further configured to receive a service cancellation request message, sent by the terminal device, of the first user device, where the service cancellation request message includes the first user device information;

the processing module, further configured to find, based on the correspondence between the first optical cable identifier, the first port identifier, and the first user device information, the first optical cable identifier and the first port identifier that correspond to the first user device;

the sending module, further configured to send a service cancellation response message to the terminal device, where the service cancellation response message is used to instruct to cancel an ONU service of the first user device, and the service cancellation response message includes the first optical cable identifier or the first port information;

the receiving module, further configured to receive a service cancellation complete message sent by the terminal device, where the service cancellation complete message is used to indicate that a connection between the first optical cable and the first optical splitter port is disconnected; and the processing module, further configured to delete the correspondence between the first optical cable identifier, the first port information, and the first user device information.

Figure 10:
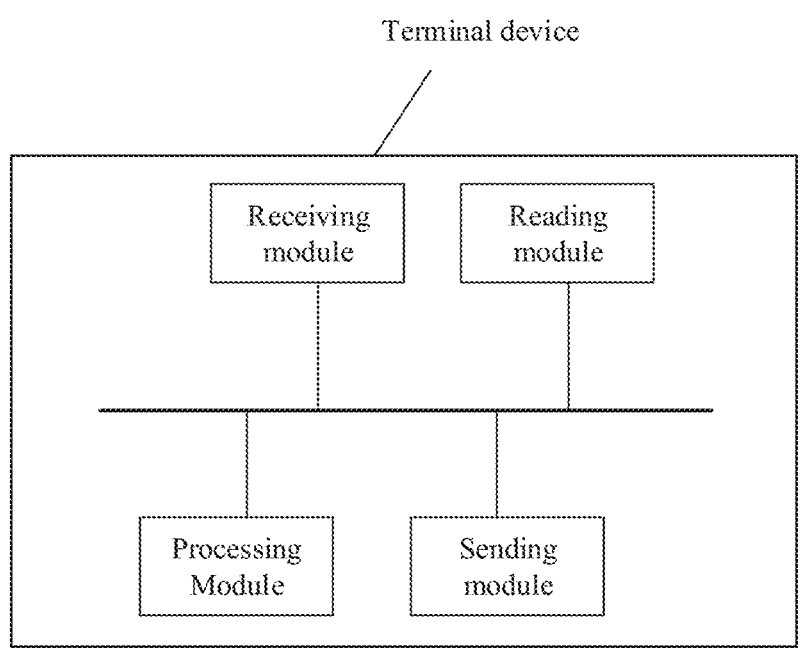
FIG. 10 is an apparatus diagram of a terminal device according to a ninth embodiment.

A ninth embodiment provides a terminal device. As shown in FIG. 10, the terminal device includes: a receiving module, a sending module, and a reading module.

The sending module is configured to send a service provisioning request message including first user device information, where the first user device information includes an address of a first user device for which a service needs to be provisioned.

The receiving module is configured to receive a first service provisioning response message sent by a network device, where the first service provisioning response message includes the first user device information and first port information, and the first port information includes a first port identifier used to indicate a first optical splitter port.

The reading module is configured to obtain a first optical cable identifier, where the first optical cable identifier corresponds to a first optical cable corresponding to the first user device information.

The receiving module is further configured to receive a service provisioning complete message, wherein the service provisioning complete message indicates that an ONU service transmitted to the user through a connection between the first optical cable and the first port has been provisioned.

The sending module is further configured to send an optical cable installation complete indication message to the network device, where the optical cable installation complete indication message carries the first port identifier, the first user device information, and the first optical cable identifier.

The first user device information may further include a user name, a service type that is applied for, a network access account, a phone number, GIS coordinates, and an SN number of an ONU.

The first port information further includes a serial number of an optical splitter in which the first optical splitter port is located and an address of the optical splitter in which the first optical splitter port is located. The address of the optical splitter may be used by a construction engineer to find the first optical splitter port.

The optical cable installation complete indication message may further carry fiber access terminal information.

Optionally, the reading module reads the fiber access terminal information stored in a fiber access terminal label on the fiber access terminal in which the first optical splitter port is located, and sends the information to the network device, where the fiber access terminal information is stored in the fiber access terminal label.

Specifically, the fiber access terminal has the fiber access terminal label, and the fiber access terminal label includes a barcode, a two-dimensional code, an RFID (Radio Frequency Identification, radio frequency identification) label, and an NFC (Near Field Communication, near field communication) label.

Optionally, the fiber access terminal information includes a model and a split ratio of an optical splitter in which the first optical splitter port is located, and a vendor and GIS coordinates of the fiber access terminal in which the first optical splitter port is located.

Specifically, that the reading module is configured to obtain a first optical cable identifier specifically includes:

reading, by the reading module, a first label on the first optical cable to obtain the first optical cable identifier, where the first optical cable identifier is stored in the first label.

The reading module may be a camera of the terminal device, an RFID reader, or an NFC reader. The reading module may read a barcode, a two-dimensional code, an RFID (Radio Frequency Identification, radio frequency identification) label, and an NFC (Near Field Communication, near field communication) label.

Optionally, the terminal device further includes:

the receiving module, further configured to receive a second service provisioning response message sent by the network device, where the second service provisioning response message includes the first user device information and second port information, and the second port information includes a second port identifier used to indicate a second optical splitter port;

the reading module, further configured to read a second label on a second optical cable to obtain a second optical cable identifier, where the second optical cable identifier is used to indicate the second optical cable connected to the second optical splitter port; and the sending module, further configured to send an error indication message to the network device, where the error indication message carries the second optical cable identifier, and the error indication message is used to indicate that the second optical splitter port is occupied by the second optical cable.

Optionally, the terminal device further includes a processing module.

The receiving module is further configured to receive a third service provisioning response message sent by the network device, where the third service provisioning response message includes the first user device information and third port information, and the third port information includes a third port identifier used to indicate a third optical splitter port.

The processing module is further configured to generate an error indication message of the third optical splitter port.

The sending module is further configured to send the error indication message to the network device, where the error indication message indicates that the third optical splitter port is in a fault state.

The error indication message may carry fault type information.

The fault type information may include physical damage indication information and line damage indication information.

Optionally, the terminal device further includes:

the sending module, further configured to send a service cancellation request message of the first user device to the network device, where the service cancellation request message includes the first user device information;

the receiving module, further configured to receive a service cancellation response message sent by the network device, where the service cancellation response message is used to instruct to cancel an ONU service of the first user device, and the service cancellation response message includes the first optical cable identifier or the first port information; and the sending module, further configured to send a service cancellation complete message to the network device, where the service cancellation complete message is used to indicate that a connection between the first optical cable and the first optical splitter port is disconnected.

The service cancellation complete message is used to indicate that the connection between the first optical cable and the first optical splitter port is disconnected. It should be noted that the disconnection herein indicates that the ONU service between the optical cable and the optical splitter port is interrupted, and does not indicate a physical disconnection.

An embodiment further provides a computer-readable storage medium. The computer-readable medium stores a computer program instruction. When the computer program instruction is executed by a computer, the method in any one of the foregoing embodiments is implemented.

An embodiment further provides a computer program product. When the computer program product is executed by a computer, the method in any one of the foregoing embodiments is implemented.

An embodiment further provides a system chip. The system chip includes a processing unit and a communications unit. The processing unit may be, for example, a processor. The communications unit may be, for example, an input/output interface, a pin, a circuit, or the like. The processing unit may execute a computer instruction, so that a chip in the communications apparatus performs the method provided in any one of the foregoing embodiments.

The embodiments provide the method and the apparatus for establishing an optical cable connection. An optical cable connected to a user is identified, an optical splitter port connected to the optical cable is identified, and a connection relationship between the user, the optical cable of the user, and the optical splitter port is accurately stored and updated. This resolves the problems that recorded information is incorrect, a port resource is wasted, information is not updated in time, and an optical cable connection is incorrect because uploaded information related to the optical cable connection is manually recorded by using the existing optical fiber connection allocation technology, thereby greatly reducing an optical cable connection error rate, facilitating service provisioning for a user, saving optical fiber resources, and saving costs of regularly arranging ODN resource information.

One or more of the foregoing modules or units may be implemented by software, hardware, or a combination thereof. When any one of the foregoing modules or units is implemented by using software, the software exists in a form of a computer program instruction, and is stored in a memory. The processor may be configured to execute the program instruction and implement the foregoing method procedure. The processor may include but is not limited to at least one of the following: a central processing unit (central processing unit, CPU), a microprocessor, a digital signal processor (DSP), a microcontroller (microcontroller unit, MCU), or an artificial intelligence processor, or various computing devices running software. Each computing device may include one or more cores used to execute a software instruction to perform an operation or processing. The processor may be built in a SoC (a system on chip) or an application-specific integrated circuit (application specific integrated circuit, ASIC), or may be an independent semiconductor chip. In addition to a core that is configured to execute a software instruction to perform an operation or processing, the processor may further include a necessary hardware accelerator, such as a field programmable gate array (field programmable gate array, FPGA), a PLD (programmable logic device), or a logic circuit that implements a dedicated logic operation.

When the foregoing modules or units are implemented by using hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and the hardware can run necessary software or does not depend on software to perform the above method procedures.

Although this application is described with reference to specific features and the embodiments thereof, it is clearly that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for establishing an optical cable connection, comprising:
    receiving, by a network device from a terminal device, a service provisioning request message comprising first user device information, wherein the first user device information comprises an address of a first user device for which a service needs to be provisioned;
    allocating, by the network device, a first optical splitter port based on the first user device information;
    sending, by the network device, a first service provisioning response message to the terminal device, wherein the first service provisioning response message comprises the first user device information and first port information, and the first port information comprises a first port identifier that identifies the allocated first optical splitter port;
    receiving, by the network device, an optical cable installation complete indication message sent by the terminal device, wherein the optical cable installation complete indication message carries the first port identifier, the first user device information, and a first optical cable identifier, and the first optical cable identifier is used to indicate a first optical cable corresponding to the first user device information; and
    storing, by the network device, a correspondence between the first optical cable identifier, the first port identifier, and the first user device information.

2. The method according to claim 1, wherein before the allocating, by the network device, a first optical splitter port based on the first user device information, the method further comprises:
    allocating, by the network device, a second optical splitter port based on the first user device information;
    sending, by the network device, a second service provisioning response message to the terminal device, wherein the second service provisioning response message comprises the first user device information and second port information, and the second port information comprises a second port identifier used to indicate the allocated second optical splitter port; and
    receiving, by the network device, an error indication message, wherein the error indication message indicates that the second optical splitter port is occupied by a second user, and the second user is in an active state.

3. The method according to claim 1, wherein before the allocating, by the network device, a first optical splitter port based on the first user device information, the method further comprises:
    allocating, by the network device, a third optical splitter port based on the first user device information;
    sending, by the network device, a third service provisioning response message to the terminal device, wherein the third service provisioning response message comprises the first user device information and third port information, and the third port information comprises a third port identifier used to indicate the allocated third optical splitter port; and
    receiving, by the network device, the error indication message, wherein the error indication message indicates that the third optical splitter port is in a fault state.

4. The method according to any one of claim 1, wherein the allocating, by the network device, a first optical splitter port based on the first user device information comprises:
    searching, by the network device, the first user device information for a plurality of fiber access terminals near the address of the first user device;
    determining, by the network device, a fiber access terminal that has a shortest distance from the address of the first user device and that comprises at least one idle optical splitter port, wherein the idle optical splitter port is an optical splitter port that has not been allocated to another user; and
    determining, by the network device, an optical splitter port from the at least one idle optical splitter port as the first optical splitter port.

5. The method according to any one of claim 1, wherein the first port information further comprises an address of the optical splitter in which the first optical splitter port is located.

6. The method according to any one of claim 1, wherein after the storing, by the network device, a correspondence between the first optical cable identifier, the first port identifier, and the first user device information, the method further comprises:
  identifying, by the network device, the first optical splitter port as an "in use" state.

7. The method according to claim 1, wherein after the storing, by the network device, a correspondence between the first optical cable identifier, the first port identifier, and the first user device information, the method further comprises:
  receiving, by the network device, a service cancellation request message of the first user device, wherein the service cancellation request message comprises the first user device information;
  finding, by the network device based on the correspondence between the first optical cable identifier, the first port identifier, and the first user device information, the first optical cable identifier and the first port identifier that correspond to the first user device;
  sending, by the network device, a service cancellation response message to the terminal device, wherein the service cancellation response message is used to instruct to cancel an optical network unit ONU service of the first user device, and the service cancellation response message comprises the first optical cable identifier and the first port identifier;
  receiving, by the network device, a service cancellation complete message sent by the terminal device, wherein the service cancellation complete message indicates that a connection between the first optical cable and the first optical splitter port is disconnected; and
  deleting, by the network device, the correspondence between the first optical cable identifier, the first port identifier, and the first user device information.

8. The method according to claim 7, wherein after the deleting, by the network device, the correspondence between the first optical cable identifier, the first port identifier, and the first user device information, the method further comprises:
  identifying, by the network device, the first optical splitter port as an "idle" state.

9. The method according to any one of claim 1, wherein the first user device information further comprises one or more of a name of the first user device, a service type that the first user device applies for, a network access account of the first user device, a phone number of the first user device, geographic information system GIS coordinates of the first user device, and a serial number SN of an ONU that corresponds to the first user device.

10. A method for establishing an optical cable connection, comprising:
  sending, by a terminal device, a service provisioning request message comprising first user device information to a network device, wherein the first user device information comprises an address of a first user device for which a service needs to be provisioned;
  receiving, by the terminal device, a first service provisioning response message from the network device, wherein the first service provisioning response message comprises the first user device information and first port information, and the first port information comprises a first port identifier used to indicate a first optical splitter port;
  obtaining, by the terminal device, a first optical cable identifier, wherein the first optical cable identifier is used to indicate a first optical cable corresponding to the first user device information;
  receiving, by the terminal device, a service provisioning complete message, wherein the service provisioning complete message indicates that an optical network unit ONU service transmitted to the first user device through a connection between the first optical cable and the first optical splitter port has been provisioned; and
  sending, by the terminal device, an optical cable installation complete indication message to the network device, wherein the optical cable installation complete indication message carries the first port identifier, the first user device information, and the first optical cable identifier.

11. The method according to claim 10, wherein the obtaining, by the terminal device, a first optical cable identifier specifically comprises:
  reading, by the terminal device, a first label on the first optical cable to obtain the first optical cable identifier, wherein the first optical cable identifier is stored in the first label.

12. The method according to claim 10, wherein before the receiving, by the terminal device, a first service provisioning response message from the network device, the method further comprises:
  receiving, by the terminal device, a second service provisioning response message sent by the network device, wherein the second service provisioning response message comprises the first user device information and second port information, and the second port information comprises a second port identifier used to indicate a second optical splitter port;
  reading, by the terminal device, a second label on a second optical cable to obtain a second optical cable identifier, wherein the second optical cable identifier is used to indicate the second optical cable connected to the second optical splitter port; and
  sending, by the terminal device, an error indication message to the network device, wherein the error indication message carries the second optical cable identifier, and the error indication message is used to indicate that the second optical splitter port is occupied by the second optical cable.

13. The method according to claim 10, wherein before the receiving, by the terminal device, a first service provisioning response message from the network device, the method further comprises:
  receiving, by the terminal device, a third service provisioning response message sent by the network device, wherein the third service provisioning response message comprises the first user device information and third port information, and the third port information comprises a third port identifier used to indicate a third optical splitter port;
  generating, by the terminal device, an error indication message of the third optical splitter port; and
  sending, by the terminal device, the error indication message to the network device, wherein the error indication message indicates that the third optical splitter port is in a fault state.

14. The method according to any one of claim 10, wherein after the sending, by the terminal device, an optical cable installation complete indication message to the network device, the method further comprises:
  sending, by the terminal device, a service cancellation request message of the first user device to the network device, wherein the service cancellation request message comprises the first user device information;

receiving, by the terminal device, a service cancellation response message sent by the network device;

canceling ONU service of the first user devices in response to the service cancellation response message, wherein the service cancellation response message comprises the first optical cable identifier and the first port identifier; and sending, by the terminal device, a service cancellation complete message to the network device, wherein the service cancellation complete message is used to indicate that a connection between the first optical cable and the first optical splitter port is disconnected.

15. A network device, comprising a processor, and a memory, wherein the network device is configured to receive a service provisioning request message comprising first user device information, wherein the first user device information comprises an address of a first user device for which a service needs to be provisioned;

the processor is configured execute computer instructions stored in memory to allocate a first optical splitter port based on the first user device information;

the network device is configured to send a first service provisioning response message to the terminal device, wherein the first service provisioning response message comprises the first user device information and the first port information, and the first port information comprises a first port identifier used to indicate the allocated first optical splitter port;

the network device is further configured to receive an optical cable installation complete indication message sent by the terminal device, wherein the optical cable installation complete indication message carries the first port identifier, the first user device information, and a first optical cable identifier, and the first optical cable identifier is used to indicate a first optical cable corresponding to the first user device information; and wherein the processor executes instructions to stores in memory a correspondence between the first optical cable identifier, the first port identifier, and the first user device information.

16. The network device according to claim 15, wherein the processor is further configured to allocate a second optical splitter port based on the first user device information;

the network device is further configured to send a second service provisioning response message to the terminal device, wherein the second service provisioning response message comprises the first user device information and second port information, and the second port information comprises a second port identifier used to indicate the allocated second optical splitter port; and the network device is further configured to receive an error indication message, wherein the error indication message indicates that the second optical splitter port is occupied by a second user, and the second user is in an active state.

17. The network device according to claim 15, wherein the processor is further configured to allocate a third optical splitter port based on the first user device information;

the network device is further configured to send a third service provisioning response message to the terminal device, wherein the third service provisioning response message comprises the first user device information and third port information, and the third port information comprises a third port identifier used to indicate the allocated second optical splitter port; and the network device is further configured to receive an error indication message, wherein the error indication message indicates that the third optical splitter port is in a fault state.

18. The network device according to any one of claim 15, wherein the receiver is further configured to receive a service cancellation request message of the first user device sent by the terminal device, wherein the service cancellation request message comprises the first user device information;

the processor is further configured to find, based on the correspondence between the first optical cable identifier, the first port identifier, and the first user device information, the first optical cable identifier and the first port identifier that correspond to the first user device;

the network device is further configured to send a service cancellation response message to the terminal device, wherein the service cancellation response message is used to instruct to cancel an ONU service of the first user device, and the service cancellation response message comprises the first optical cable identifier or the first port information;

the network device is further configured to receive a service cancellation complete message sent by the terminal device, wherein the service cancellation complete message is used to indicate that a connection between the first optical cable and the first optical splitter port is disconnected; and the processor is further configured to delete the correspondence between the first optical cable identifier, the first port information, and the first user device information.

19. A terminal device, wherein the terminal device is configured to send a service provisioning request message comprising first user device information, wherein the first user device information comprises an address of a first user device for which a service needs to be provisioned;

the terminal device is configured to receive a service provisioning response message sent by the network device, wherein the service provisioning response message comprises the first user device information and first port information, and the first port information comprises a first port identifier used to indicate a first optical splitter port;

the terminal device is configured to obtain a first optical cable identifier, wherein the first optical cable identifier corresponds to a first optical cable corresponding to the first user device information;

the terminal device is further configured to receive a service provisioning complete message, wherein the service provisioning complete message indicates that an ONU service transmitted to the first user device through a connection between the first optical cable and the first port has been provisioned; and the terminal device is further configured to send an optical cable installation complete indication message to the network device, wherein the optical cable installation complete indication message carries the first port identifier, the first user device information, and the first optical cable identifier.

20. The terminal device according to claim 19, wherein that the terminal device obtains a first optical cable identifier specifically comprises:
    reading a first label on the first optical cable to obtain the first optical cable identifier, wherein the first optical cable identifier is stored in the first label.

* * * * *